(12) United States Patent
Lawson et al.

(10) Patent No.: US 12,361,207 B2
(45) Date of Patent: Jul. 15, 2025

(54) ASSIGNING MOBILE MESSAGE RECIPIENTS TO TEMPLATES OF A MOBILE MESSAGE FOR AUTOMATED TESTING OF THE TEMPLATES

(71) Applicant: Klaviyo, Inc, Boston, MA (US)

(72) Inventors: Michael T. Lawson, Boston, MA (US); Woody Austin, Boston, MA (US); Ally Hangartner, Sarasota, FL (US); Carola Leiva, Boston, MA (US); Nicholas Hartmann, Swampscott, MA (US); Thomas Culp, Cambridge, MA (US); Justin Xu, Boston, MA (US); Maritza Ebling, Boston, MA (US)

(73) Assignee: Klaviyo, Inc, Boston, MA (US)

( * ) Notice: Subject to any disclaimer, the term of this patent is extended or adjusted under 35 U.S.C. 154(b) by 437 days.

(21) Appl. No.: 17/976,823

(22) Filed: Oct. 30, 2022

(65) Prior Publication Data

US 2023/0413020 A1    Dec. 21, 2023

Related U.S. Application Data

(60) Provisional application No. 63/344,591, filed on May 22, 2022.

(51) Int. Cl.
*H04W 4/12*         (2009.01)
*G06F 40/186*     (2020.01)
(Continued)

(52) U.S. Cl.
CPC .......... *G06F 40/186* (2020.01); *G06Q 30/02* (2013.01); *G06Q 30/0201* (2013.01);
(Continued)

(58) Field of Classification Search
CPC .. G06F 40/186; G06Q 30/02; G06Q 30/0201; H04W 4/021; H04W 4/12; H04W 4/14;
(Continued)

(56) References Cited

U.S. PATENT DOCUMENTS 6,519,571 B1    2/2003    Guheen et al.
7,130,808 B1    10/2006   Ranka et al.
(Continued)

*Primary Examiner* — Nathan S Taylor
(74) *Attorney, Agent, or Firm* — Brian R. Short

(57) ABSTRACT

Apparatuses, methods, and systems for assigning mobile message recipients to templates of a mobile message. One method includes generating at least a first template of the mobile message and a second template of the mobile message, each of the first template and the second template having at least a different content or a different send time, determining information associated with the mobile message, identifying and sending guidance for a marketing manager based on the information associated with the mobile message, receiving user-selected configurations from the marketing manager in response to the guidance, and assigning a first group of mobile message recipients to the first template of the mobile message and a second respective group of mobile message recipients to the second template of the mobile message, wherein the assigning is based on the information associated with the mobile message and the user-selected configurations received from the marketing manager.

16 Claims, 17 Drawing Sheets

(51) Int. Cl.
*G06Q 30/02* (2023.01)
*G06Q 30/0201* (2023.01)
*H04W 4/021* (2018.01)
*H04W 4/14* (2009.01)

(52) U.S. Cl.
CPC ............. *H04W 4/021* (2013.01); *H04W 4/12* (2013.01); *H04W 4/14* (2013.01)

(58) Field of Classification Search
CPC ............. H04W 64/00; H04W 52/0229; H04W 52/0235; H04W 68/025; H04W 76/28; H04W 24/10; H04W 52/0206; H04W 52/0216; H04W 52/0232; H04W 64/006; H04W 8/24; H04W 52/02; H04W 4/06; H04W 76/40; H04W 72/1268; H04W 74/0833; H04W 74/0841; H04W 74/0866; H04W 74/08; H04W 72/12; H04W 56/005; H04W 56/00; H04L 5/0048; H04L 5/0053; H04L 5/00; H04L 1/0003; H04L 1/0009; H04L 1/0026; H04L 1/1816; H04L 1/1822; H04L 1/1861; H04L 12/1868; H04L 2001/0093; H04L 5/0055; H04L 1/18; H04L 43/0864; G01S 13/003; G01S 13/765; G01S 13/767; G01S 13/87; G01S 13/00; G01S 13/76; G01S 5/02

See application file for complete search history.

(56) References Cited

U.S. PATENT DOCUMENTS

| | | | |
|---|---|---|---|
| 7,533,090 B2 | 5/2009 | Agarwal et al. | |
| 7,752,607 B2 | 7/2010 | Larab et al. | |
| 7,845,950 B2 | 12/2010 | Driscoll et al. | |
| 7,975,000 B2 | 7/2011 | Dixon et al. | |
| 10,438,230 B2 | 10/2019 | Moran et al. | |
| 10,503,912 B1 | 12/2019 | Kerr | |
| 11,734,724 B1* | 8/2023 | Kingman, Jr. | G06Q 30/0242 705/14.66 |
| 11,847,106 B2* | 12/2023 | Urdiales | G06F 16/215 |
| 2002/0004745 A1 | 1/2002 | Bascobert et al. | |
| 2006/0162071 A1 | 7/2006 | Dixon et al. | |
| 2007/0100805 A1 | 5/2007 | Ramer et al. | |
| 2008/0189156 A1 | 8/2008 | Voda et al. | |
| 2010/0049534 A1 | 2/2010 | Whitnah et al. | |
| 2011/0307331 A1 | 12/2011 | Richard et al. | |
| 2012/0191546 A1 | 7/2012 | Phelan et al. | |
| 2013/0066665 A1 | 3/2013 | Tamhane et al. | |
| 2013/0080243 A1 | 3/2013 | Dias | |
| 2014/0100964 A1 | 4/2014 | Kramer et al. | |
| 2014/0278747 A1 | 9/2014 | Gumm | |
| 2014/0378071 A1 | 12/2014 | Acousta | |
| 2015/0019662 A1 | 1/2015 | O'Kane et al. | |
| 2015/0170213 A1 | 6/2015 | O'Malley | |
| 2015/0220577 A1* | 8/2015 | Sengupta | G06Q 10/06 707/758 |
| 2015/0227962 A1 | 8/2015 | Wical et al. | |
| 2016/0117717 A1* | 4/2016 | Moreau | G06Q 30/0245 705/14.42 |
| 2016/0189176 A1 | 6/2016 | Newnham et al. | |
| 2017/0178193 A1* | 6/2017 | Jagannath | G06Q 30/04 |
| 2018/0082326 A1 | 3/2018 | Vlassis | G06Q 30/0242 |
| 2018/0225027 A1* | 8/2018 | Cooke | G06F 3/04842 |
| 2018/0293502 A1* | 10/2018 | Sengupta | G06Q 10/067 |
| 2019/0122254 A1 | 4/2019 | Duquette et al. | |
| 2019/0130333 A1 | 5/2019 | Li et al. | |
| 2019/0259041 A1 | 8/2019 | Jackson | |
| 2020/0319996 A1 | 10/2020 | Mordo et al. | |
| 2020/0327577 A1 | 10/2020 | Truong et al. | |
| 2021/0004422 A1 | 1/2021 | Sun et al. | |
| 2021/0042830 A1* | 2/2021 | Burke | G06Q 20/341 |
| 2021/0109897 A1 | 4/2021 | Brechbuhl et al. | |
| 2021/0357952 A1 | 11/2021 | Liu et al. | |
| 2022/0283932 A1 | 9/2022 | Arbour et al. | |
| 2022/0405783 A1* | 12/2022 | Kondamudi | G06N 20/00 |
| 2022/0405784 A1* | 12/2022 | Kondamudi | G06N 20/20 |
| 2022/0414696 A1* | 12/2022 | Kondamudi | G06Q 30/0276 |
| 2022/0414705 A1* | 12/2022 | Jain | G06N 20/00 |
| 2023/0316186 A1* | 10/2023 | Miller | G06F 40/40 705/7.25 |

\* cited by examiner

Generating, by a server, at least a first template of the mobile message and a second template of the mobile message, each of the first template and the second template having at least a different content or a different send time
710

Determining, by the server, information associated with the mobile message
720

Identifying and sending, by the server, guidance for a marketing manager (merchant) based on the information associated with the mobile message
730

Receiving, by the server, user-selected configurations from the marketing manager (merchant) in response to the guidance
740

Assigning, by the server, a respective group of mobile message recipients to the first template of the mobile message and the second template of the mobile message, wherein the assigning is based on the information associated with the mobile message and the user-selected configurations received from the marketing manager (merchant)
750

*FIG. 7*

Determining the range of values that the N success rates of N different templates could take given a pre-defined level of random chance
1110

Comparing a fraction of credible intervals that are overlapping, wherein credible intervals include a range of values that the success rate is likely to fall within after accounting for random chance
1120

Checking that these ranges of values indicate a sufficiently higher success rate for the leading variation after accounting for random chance
1130

*FIG. 11*

```
┌─────────────────────────────────────────────────────────────────────────────┐
│ Generating, by a server, at least a first template of the mobile message and a second template of │
│ the mobile message, each of the first template and the second template having at least a different │
│                         content or a different send time                           │
│                                      1510                                          │
└─────────────────────────────────────────────────────────────────────────────┘
                                        │
                                        ▼
┌─────────────────────────────────────────────────────────────────────────────┐
│ Assigning, by the server, a respective group of mobile message recipients to the first template of │
│              the mobile message and the second template of the mobile message              │
│                                      1520                                          │
└─────────────────────────────────────────────────────────────────────────────┘
                                        │
                                        ▼
┌─────────────────────────────────────────────────────────────────────────────┐
│ Determining automatically, by the server, whether the first template of the mobile message has a  │
│      statistical advantage over the second template of the mobile message through testing         │
│                                      1530                                          │
└─────────────────────────────────────────────────────────────────────────────┘
                                        │
                                        ▼
┌─────────────────────────────────────────────────────────────────────────────┐
│ Collecting test data from testing including mobile message recipient actions of the first template │
│            of the mobile message and the second template of the mobile message             │
│                                      1540                                          │
└─────────────────────────────────────────────────────────────────────────────┘
                                        │
                                        ▼
┌─────────────────────────────────────────────────────────────────────────────┐
│ Generating estimates of a success rates for the first template and the second template including  │
│ applying an analysis method to the collected test data to determine a win probability difference  │
│  between a win probability for the first template and a win probability for the second template,  │
│    and determine that the win probability difference is greater than a selected win threshold     │
│                                      1550                                          │
└─────────────────────────────────────────────────────────────────────────────┘
                                        │
                                        ▼
┌─────────────────────────────────────────────────────────────────────────────┐
│    Determining that a precision of the estimates of the success rate is greater than a precision    │
│                                    threshold                                        │
│                                      1560                                          │
└─────────────────────────────────────────────────────────────────────────────┘
                                        │
                                        ▼
┌─────────────────────────────────────────────────────────────────────────────┐
│         Determining that greater than a volume threshold of test data has been collected           │
│                                      1570                                          │
└─────────────────────────────────────────────────────────────────────────────┘
```

*FIG. 15*

ASSIGNING MOBILE MESSAGE RECIPIENTS TO TEMPLATES OF A MOBILE MESSAGE FOR AUTOMATED TESTING OF THE TEMPLATES

RELATED PATENT APPLICATIONS

This patent application claims priority to Provisional Patent Application Ser. No. 63/344,591, filed May 22, 2022, which is herein incorporated by reference.

FIELD OF THE DESCRIBED EMBODIMENTS

The described embodiments relate generally to intelligent electronic commerce. More particularly, the described embodiments relate to systems, methods and apparatuses for assigning mobile message recipients to templates of a mobile message for automated testing of the templates.

BACKGROUND

Templates can be used for defining a mobile message which can be provided to a mobile message recipient. Different mobile messages can have different levels of success when provided to the mobile message recipient (customer).

It is desirable to have methods, apparatuses, and systems for assigning mobile message recipients to templates of a mobile message for automated testing of the templates.

SUMMARY

An embodiment includes a computer-implemented method for testing of a mobile message. The method includes generating, by a server, at least a first template of the mobile message and a second template of the mobile message, each of the first template and the second template having at least a different content or a different send time, determining, by the server, information associated with the mobile message, identifying and sending, by the server, guidance for a marketing manager (merchant) based on the information associated with the mobile message, receiving, by the server, user-selected configurations from the marketing manager (merchant) in response to the guidance, and assigning, by the server, a first respective group of mobile message recipients to the first template of the mobile message and a second respective group of mobile message recipients to the second template of the mobile message, wherein the assigning is based on the information associated with the mobile message and the user-selected configurations received from the marketing manager (merchant).

Another embodiment includes a system for automated testing and selection of multiple templates of a mobile message. The system includes a marketing manager server configured to operate and manage a website, a plurality of mobile devices configured to receive mobile messages, and a server electronically connected to the marketing manager server and the plurality of mobile devices. For an embodiment, the server is configured to generate at least a first template of the mobile message and a second template of the mobile message, each of the first template and the second template having at least a different content or a different send time, determine information associated with the mobile message, identify and send guidance for a marketing manager (merchant) based on the information associated with the mobile message, receive user-selected configurations from the marketing manager (merchant) in response to the guidance, and assign a first respective group of mobile message recipients to the first template of the mobile message and a second respective group of mobile message recipients to the second template of the mobile message, wherein the assigning is based on the information associated with the mobile message and the user-selected configurations received from the marketing manager (merchant).

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 is a flow chart that includes steps of a method for assigning mobile message recipients to templates of a mobile message for automated testing of the templates, according to an embodiment.

FIG. 11 is a flow chart that includes steps of a method of determining a precision estimate of a success rate of a template, according to an embodiment.

FIG. 15 is a flow chart of steps of a method of automated testing and selection of multiple templates of a mobile message, according to an embodiment.

DETAILED DESCRIPTION

The embodiments described include methods, apparatuses, and systems for automated testing and selection of multiple templates of a mobile message. For an embodiment, for the testing, a first respective group of mobile message recipients are assigned to a first template of the mobile message and a second respective group of mobile message recipients are assigned to the second template of the mobile message, wherein the assigning is based on the information associated with the mobile message and the user-selected configurations received from a marketing manager (merchant).

Figure 1:
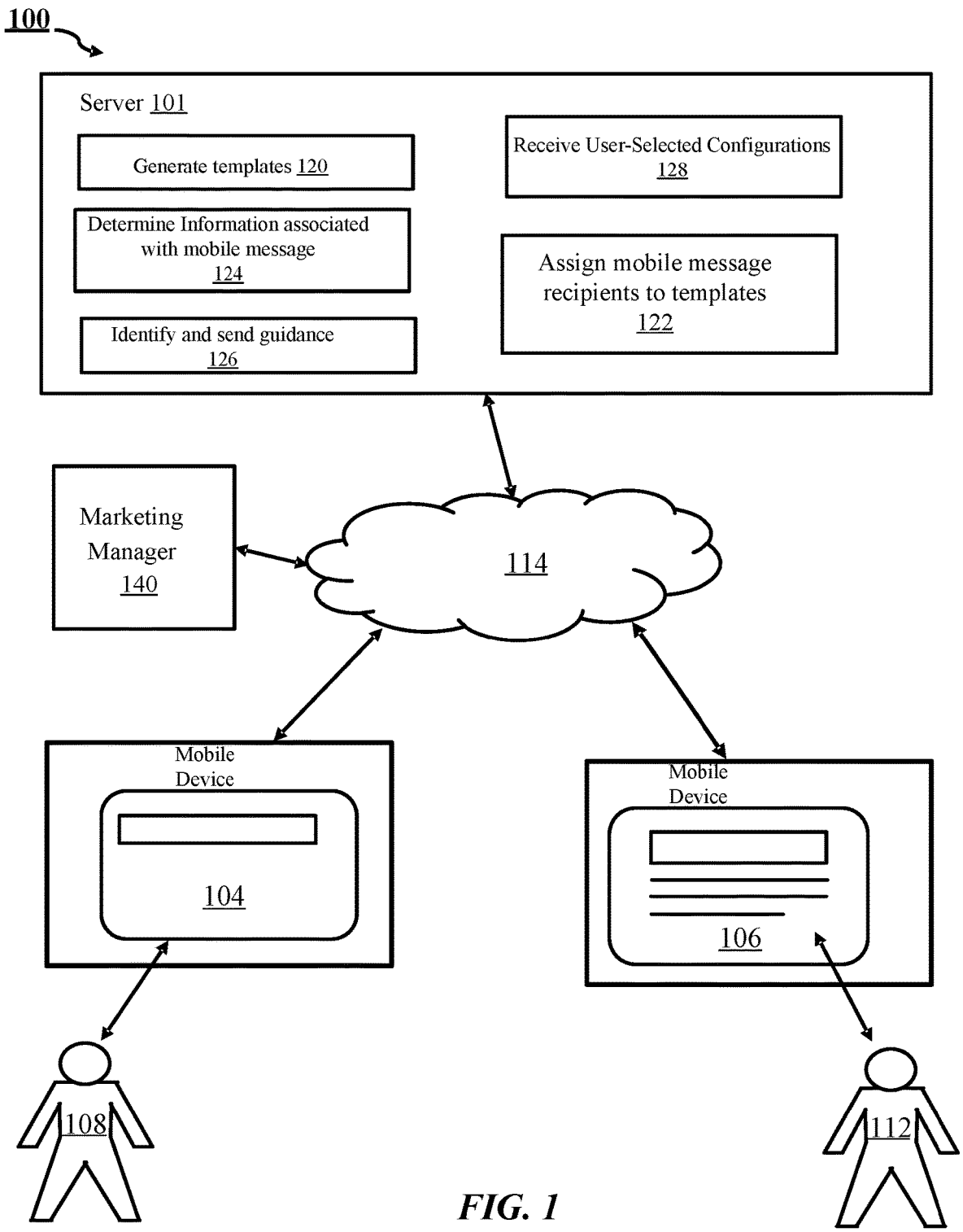
FIG. 1 shows a system for assigning mobile message recipients to templates of a mobile message for automated testing of the templates, according to an embodiment.

FIG. 1 shows a system 100 for assigning mobile message recipients to templates of a mobile message for automated testing of the templates, according to an embodiment. The system 100 includes a server 101. For an embodiment, the server 101 is electronically connected through a network 114 to electronic mobile devices 104, 106 of mobile message recipients 108, 112. For an embodiment, the server 101 operates to generate 120 at least a first template of the mobile message and a second template of the mobile message each having different content or different send times. For at least some embodiments, the first template and the second template further include different displays. That is, mobile messages associated with the first template and the second template display mobile messages in varying ways. Though described here as the generation of a first template and a second template, it is to be understood that the server 101 operates to generate N templates that include the first template and a second template.

For an embodiment, the first template and the second template are sent to all the mobile message recipients at different specific times. For example, the first template may be sent at 7 p.m. UTC and the second template is sent at 8 p.m. UTC. For an embodiment, the first template and the second template are sent to the mobile message recipients at different times dynamically determined based on characteristics of the mobile message recipients, such as, geolocation. For example, the first template may be sent at 7 p.m. in recipient local time zone and the second template may be sent at 8 p.m. in recipient local time zone.

A marketing manager (server) 140 operates and manages an ecommerce website and may be referred to as a merchant. For an embodiment, the marketing manager 140 includes a server of a business that operates to directly control the ecommerce website. For an embodiment, the marketing manager 140 includes a combination of the business and a third party to operate to control the ecommerce website. For an embodiment, the marketing manager 140 is a customer of the operator of the server 101. For an embodiment, the marketing manager 140 is a combination of the customer of the operator of the server 101 and a third party (such as, a Shopify platform).

For an embodiment, each of the N templates includes a set of data objects that combine to represent a structure of a mobile message. As described, the first and second templates of the N templates of the mobile message each have a different content, a different send time, and/or a different behavior. The different displays of the mobile message can include a changing display, such as, movement or varying display intensity. Accordingly, the set of data objects of each of the first and second templates combine to represent a structure of mobile message having a different content, different send times, or different behavior of the mobile messages. For an embodiment, the structure of the mobile message includes the content, the send time, or the behavior control. For an embodiment, the templates additional include information pertaining to testing of the mobile message(s). The additional information can include, for example, a test name, a test description (makes it easier to remember what is being tested), an ending date, and/or specific settings that correspond to statistical significance criteria. For an embodiment, the additional information pertaining to the testing combined with the data for the templates define a test.

For an embodiment, the server 101 operates to determine 124 information associated with the mobile message. For an embodiment, the information associated with the mobile message is at least partially generated automatically. For an embodiment, the information is stored in a database that is accessible by the server 101 and includes information pertaining to a merchant of the marketing manager 140 and mobile message recipients 108, 112 that are customers of the merchant. For example, the information pertaining to the merchant may include counties the merchant has a subscription to send mobile messages, a remaining mobile message sending balance, and/or mobile message recipients of the merchant. This information can be populated, for example, by the subscription to list events or changes to the merchant's subscription plan.

For various embodiments, the information associated with the mobile message includes message content and a send time (which can be user-generated).

For an embodiment, the information associated with the mobile message includes a geolocation of a cell carrier that operates to send the mobile message. For an embodiment, the geolocation of a cell carrier is automatically generated. For an embodiment, the geolocation of the mobile message recipient is inferred from information from the cell carrier. For an embodiment, the geolocation of the cell carrier (Verizon USA® or Verizon Canada®) is utilized and may be used to infer the geolocation of the mobile recipient. For an embodiment, the geolocation of the marketing manager (account of) is also used and may factored into the guidance provided to the marketing manager.

For an embodiment, the information associated with the mobile message includes a size of an electronic campaign that the mobile message is associated. This information can be automatically generated or can be user (merchant) generated. For an embodiment, the marketing manager 140 specifies a list of customers (mobile message recipients) the merchant of the marketing manager wants to include and exclude from the campaign, then, for an embodiment, the server 101 automatically determines the size of the campaign based on those criteria.

For an embodiment, the information associated with the mobile message includes a rate of message sending available to a merchant of an electronic campaign of the mobile message per geographical region (that is, for example, country). For an embodiment, this information is generated automatically, but at least partially determined by the subscription plan of the merchant and a sending number type (for example, toll free versus short code versus alphanumeric.

For an embodiment, the information associated with the mobile message includes legal restrictions in selected regions in which the mobile message is to be sent. For an embodiment, this information is generated automatically. The legal restrictions include, for example, . . . .

For an embodiment, the information associated with the mobile message comprises latency of reported subsequent actions by cellular carriers. For an embodiment, this information is generated automatically. For at least some embodiments, SMS (Short Message Service) sending platforms (for example, Twilio®) have APIs (application programming interfaces) that can be used to retrieve information on whether messages were actually delivered to the intended mobile message recipients. However, there may be bandwidth and latency issues involved here. Relating to bandwidth, the number of mobile messages that can be sent per unit of time has a maximum cap, and for an embodiment, guidance needs to allow enough time for the entire test group (that is, all templates in the test) of the mobile message to be sent and allow enough time to pass for the analytics relevant to the test period to accrue. Relating to latency, the carriers have delays of differing length in how quickly the carriers report analytics, which introduces delays for obtaining analytics relevant to the test period (that is, analytics used to determine the winner of the test).

For an embodiment, the information associated with the mobile message include platform-wide event rates and latency. For an embodiment, this information is generated automatically, but based on monitoring actions by merchants (one or more marketing managers 140) as customers of the operator of the server 101, and mobile message recipients. For an embodiment, a suggested length of time for testing of the templates (for example, an A/B test) is based on how quickly click events (actions of the mobile message recipients in response to receiving a mobile message) typically occurs from the time the mobile message is sent.

For an embodiment, the information associated with the mobile message comprises a remaining balance for message sending available to the merchant. For an embodiment, this information is generated automatically. For an embodiment, this information is merchant generated. For an embodiment, this information includes a remaining balance (that is, the amount of messages the subscription of the merchant allows the merchant to send this period that the merchant has not yet sent) is automatically retrieved at the time of a test creation. For an embodiment, actions taken by the merchant after (for example, sending more mobile messages) can affect the assignment (for example, in an extreme case, there may be 0 remaining messages to assign).

For an embodiment, the server 101 operates to identify and send guidance 126 for the marketing manager (merchant) 140 based on the information associated with the mobile message. For an embodiment, the guidance includes warnings. For an embodiment, identifying and sending the guidance for the marketing manager (merchant) based on the information associated with the mobile message includes generating guidance to the marketing manager based on the information associated with the mobile message, and communicating the guidance to the marketing manager.

For an embodiment, the guidance includes an alert within a user interface (UI) that alerts the merchant of the marketing manager if the send time of the mobile message is outside of compliant sending hours.

For an embodiment, the guidance includes an alert within a user interface (UI) that alerts the merchant of the marketing manager if a test duration of the templates of the mobile message is too short based on carrier reporting delays.

For an embodiment, the guidance is based on SMS (short message service) compliance laws. For example, this information can include a warning that sending of a mobile message to a mobile message recipient will not occur in the local time zone of the mobile message recipient. Further, for example, this information can include a warning that sending (either of the test message templates or the selected winner) will occur in a time prohibited by SMS marketing regulations.

For an embodiment, the guidance is based on an expected number of mobile message recipients included in a testing of the first and second templates. For example, the guidance can be used to set the test size based on an expected level of statistical confidence that will be reached by the test. Further, for example, the guidance can be used to set the test size based on the latency of message sending and the latency of events used to determine the winner of the test. For at least some embodiments, the latencies include the previously described carrier latencies, plus the latency inherent to the behavior of mobile message recipients (that is, for example, mobile message recipients not checking their mobile messages instantly or waiting to decide before taking an action, such as, clicking a link). For an embodiment, the latency is determined by a combination of API documentation (relevant to the carrier latency) and behaviors observed across the platform (relevant to both carrier latency and mobile message recipient latency). Guidance is given to the marketing manager to choose the test size based on the expected bandwidth and latency. For an embodiment, the lower the bandwidth and higher the latency, the guidance may include suggesting lower the test size and higher the test duration. For an embodiment, the higher the bandwidth and lower the latency, the guidance may include suggesting a greater test size and a lower the test duration.

For an embodiment, the guidance is based on a metric to be used to determine a winner of a testing of the first and second templates. For example, the guidance can be used to choose a different winning metric if the chosen win metric is likely to result in low statistical confidence based on the chosen test duration and test size. For an embodiment, the low statistical confidence is determined based on aggregate behavior of mobile message recipients across the platform and statistical calculations.

For an embodiment, the guidance is based on a length of time test between the template should be run. For example, the guidance can be to set the test duration based on the latency of message sending and the latency of events used to determine the winner of the test.

For an embodiment, the guidance is based on content. For example, the guidance can include a link that is possible to click in each variation of the templates.

For an embodiment, the guidance is based on the send time of the mobile message. For example, the guidance can include suggesting that each variation of the template should have a different send time. For an embodiment, the guidance is template specific. For example, the guidance may include quiet hours warnings for a single template that is planned to be sent outside of legal sending hours but not for a different template that is planned to be sent during legal sending hours.

For an embodiment, the server 101 operates to receive user-selected configurations 128 from the marketing manager (merchant) in response to the guidance. For an embodiment, the received user-selected configurations include a size of a testing of at least the first template and the second template. For an embodiment, the received user-selected configurations include a number of variations of the templates. For an embodiment, the received user-selected configurations include a percentage of campaign mobile message recipients included in the test group (equivalent to number of mobile message recipients included in the test group). For an embodiment, the received user-selected configurations include a total number of campaign mobile message recipients.

For an embodiment, the received user-selected configurations include a duration of testing of at least the first template and the second template. For an embodiment the duration of testing is the length of time that the test will run.

For an embodiment, the received user-selected configurations include a send time of the mobile message including at least the first template and the second template of testing of at least the first template and the second template. That is, the received user-selected configurations include send times of each mobile message template.

For an embodiment, the users (merchants) select configurations that are received by the server 101, and the server 101 assigns mobile message recipients to the different variations for testing the templates based at least on the received user-selected configurations.

For an embodiment, the server 101 operates to assign 122 a first respective group of mobile message recipients to the first template of the mobile message and a second respective group of mobile message recipients to the second template of the mobile message, wherein the assigning is based on the information associated with the mobile message and the user-selected configurations received from the marketing manager (merchant) 140.

For an embodiment, the assigning is based on the information associated with the mobile message and the user-selected configurations received from the marketing manager (merchant). For an embodiment, the assigning facilitates greater than a statistical threshold of fairness of the testing across multiple merchants and multiple mobile message recipients of the mobile message. For an embodiment, while the assigning of mobile message recipients is as described, the assigning of mobile message recipients to templates is statistically random across geolocations of the cell carriers. For example, for an embodiment, the templates are assigned randomly within each country.

For an embodiment, the server 101 operates to send the mobile message according to the first template to the first respective group of mobile message recipients, and according to the second template to the second respective group of mobile message recipients.

An embodiment further includes testing the first and second templates, which for an embodiment includes the server 101 determining automatically whether the first template of the mobile message has a statistical advantage over the second template of the mobile message through the testing based on the assigning. As will be described, the testing includes monitoring actions by mobile message recipients. Such actions include, for example, click rates (selection of a link within a received mobile message), placed order rates, and/or a composite of click rates and placed order rates.

Figure 2:
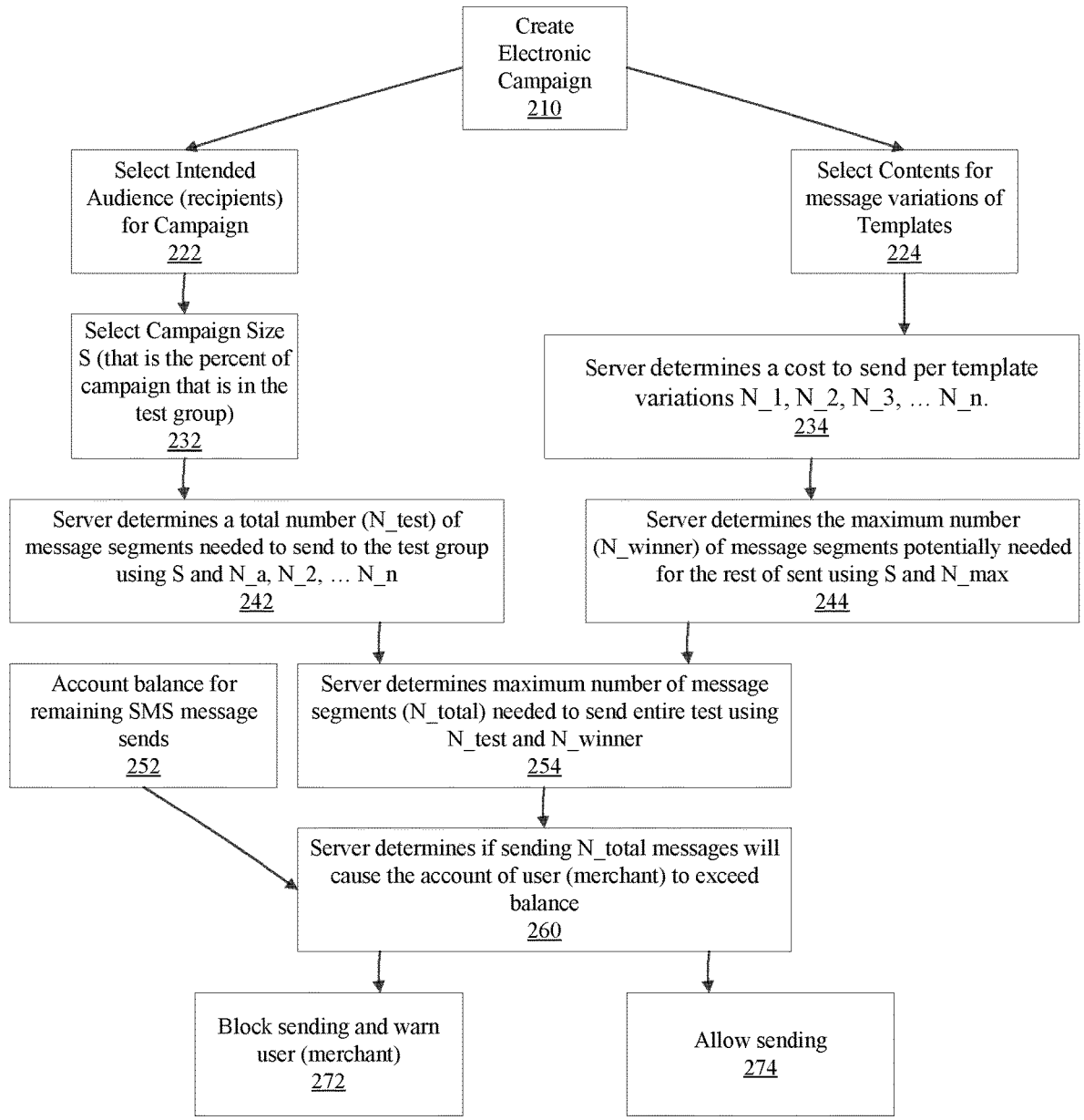
FIG. 2 is a flow chart that includes steps of a method for estimating if a merchant account has enough remaining balance to send an A/B testing mobile message, according to an embodiment.

FIG. 2 is a flow chart that includes steps of a method for estimating if a merchant account has enough remaining balance to send an A/B testing mobile message, according to an embodiment. For an embodiment, estimating if a merchant account has enough remaining balance includes determining whether there is a large number of messages left in their subscription limit or an actual balance in a pay-per-message plan. If there is an insufficient number of messages remaining of a balance left, then for an embodiment, a warning is sent to the merchant.

A step 210 includes creating an electronic campaign. For an embodiment, the electronic campaign is a mobile message campaign. For an embodiment, the user (merchant) creates the electronic campaign. For an embodiment, the server 101 may receive campaign inputs from the marketing manager (merchant) 140. For an embodiment, the electronic campaign is related to determined information associated with the mobile message since the campaign can be used to determine some of the information associated with the mobile message.

A step 222 includes selecting an intended audience (mobile message recipients) for the electronic campaign. For an embodiment, the selection is made using information about mobile message recipients stored in the server and/or criteria defined by the user (merchant). For an embodiment, the user (merchant) selects the mobile message recipients directly. For an embodiment, the user (merchant) selects groups of mobile message recipients to send the mobile message to and groups of mobile message recipients to exclude from sending. For an embodiment, the user (merchant) defines criteria and the server automatically determines all mobile message recipients that match those criteria. For an embodiment, the server automatically determines the mobile message recipients based on criteria set by the server and/or the user (merchant).

A step 232 includes selecting a campaign size S that includes, for example, a percent of the campaign that is included in the test group for testing the templates of the mobile message. For an embodiment, the selection is made using information about the campaign and knowledge of best practices for A/B testing, stored within the server and/or specified by the user (merchant). For an embodiment, the server automatically suggests a test size based on the number of templates included in the A/B test and the content of those templates, then the user (merchant) either accepts that test size or chooses a new one. For an embodiment, the test size has a fixed minimum threshold stored in the server to ensure a sufficiently large number of mobile message recipients in each group. For an embodiment, a user (merchant) specifies to use the entire group of mobile message recipients as the test group, forgoing a chance of sending the winning variation to a winner group, to maximize the chance of seeing a statistically significant result.

A step 224 includes selecting contents for message variations of the templates. For an embodiment, selection of content of the templates is made using best practices of electronic marketing and A/B testing, stored in the server and/or specified by the user. For an embodiment, each template has the exact same content except for the opening salutation (for example, "Hi," vs. "Hi {recipient's first name},". For an embodiment, each template has the exact same content except that each template contains a different image. For an embodiment, one template mentions a sale and includes a coupon while the other template does not.

A step 234 includes the server 101 determining a cost to send per template variations N_1, N_2, N_3, ... N_n. For an embodiment, the cost to send each template is determined by the server based on information contained in or associated with each template and the mobile message recipients associated with that template. That is, the number of characters in the template, the presence of special characters (e.g. emojis) in the template, the geolocation of the mobile message recipients associated with the template, and/or the presence or absence of an image in that template. For an embodiment, if template 1 is being sent only to mobile message recipients in the USA and has 120 characters with no emojis and no image, while template 2 is being sent only to mobile message recipients in the USA and has 240 characters with no emojis and no image, template 2 will have a different cost to send since its character count exceeds 160, which requires sending 2 SMS messages rather than 1. For an embodiment, if template 1 is being sent only to mobile message recipients in the USA and has 120 characters with no emojis and an image, while template 2 is being sent only to mobile message recipients in the USA and has 120 characters with no emojis and a GIF, template 2 will have a different cost to send since it contains an image, which requires sending via MMS rather than SMS. For an embodiment, if template 1 is being sent only to mobile message recipients in the USA and has 120 characters with no emojis and an image, while template 2 is being sent only to mobile message recipients in the UK and has 120 characters with no emojis and no image, template 2 will have a different cost to send since messages sent to the UK and the USA have different associated costs.

A step 242 includes the server 101 determining a total number (N_test) of message segments needed to send to the test group using S and N_a, N_2, ... N_n. For an embodiment, the cost to send the entire test group is determined using the costs determined in step 234 and best practices of electronic message sending stored in the server and/or supplied by the user. For an embodiment, the overall cost of the test group is calculated by summing the costs determined in step 234. For an embodiment, the overall cost of the test group is calculated by summing the costs determined in step 234 and adding a buffer based on the maximum length of dynamic content contained in the templates, which is automatically determined by the server. For an embodiment, the overall cost of the test group is calculated by summing the costs determined in step 234 and adding a user-specified 5% buffer.

A step 244 includes the server 101 determining a maximum number (N_winner) of message segments potentially needed for the rest of sent using S and N_max. For an embodiment, the maximum cost to send the rest of the campaign (i.e. the winner group) is determined using the costs determined in step 234, the test size, and best practices of electronic message sending stored in the server and/or supplied by the user. For an embodiment, the maximum cost of the rest of send is calculated by using the highest template cost determined in step 234 and multiplying that cost by the number of recipients in the rest of send (i.e. the winner group). For an embodiment, the maximum cost of the rest of send is calculated by using the highest template cost determined in step 234 and multiplying that cost by the number of recipients in the rest of send (i.e. the winner group) and adding a buffer based on the maximum length of dynamic content contained in the templates, which is automatically determined by the server. For an embodiment, the maximum cost of the rest of send is calculated by using the highest template cost determined in step 234 and multiplying that cost by the number of recipients in the rest of send (that is. the winner group) and adding a user-specified 5% buffer.

A step 254 includes the server 101 determining a maximum number of message segments (N_total) needed to send the entire test using N_test of step 242 and N_winner of step 244. For an embodiment, the maximum cost to send the entire A/B test is determined using the costs determined in step 242 and step 244 and best practices of electronic message sending stored in the server and/or supplied by the user. For an embodiment, the maximum cost of the entire A/B test is the sum of the cost of the test group determined in step 242 and the maximum cost of the winner group determined in step 244. For an embodiment, the maximum cost of the entire A/B test is the sum of the cost of the test group determined in step 242 and the maximum cost of the winner group determined in step 244 plus a buffer based on the average cost of mobile message A/B tests across the platform, which is automatically determined by the server. For an embodiment, the maximum cost of the entire A/B test is the sum of the cost of the test group determined in step 242 and the maximum cost of the winner group determined in step 244 plus a user-specified 5% buffer.

A step 252 includes determining an account balance of the user (merchant) for the remaining SMS message send. For an embodiment, this is determined by the server looking up the remaining balance for the user (merchant) account from a database.

A step 260 includes the server 101 determining if sending N_total messages will cause the account of the user (merchant) to exceed the balance of message sends available.

A step 272 includes blocking the sending and warning the user (merchant) that sending the N_total messages will exceed the balance of massages sends available to the user (merchant). For an embodiment, this is included within the guidance for the marketing manager based on information in the mobile message.

A step 274 includes allowing the sending of the N_total messages because the sending will not exceed the balance of messages sends available. For an embodiment, this is included within the guidance for the marketing manager based on information in the mobile message.

Figure 3:
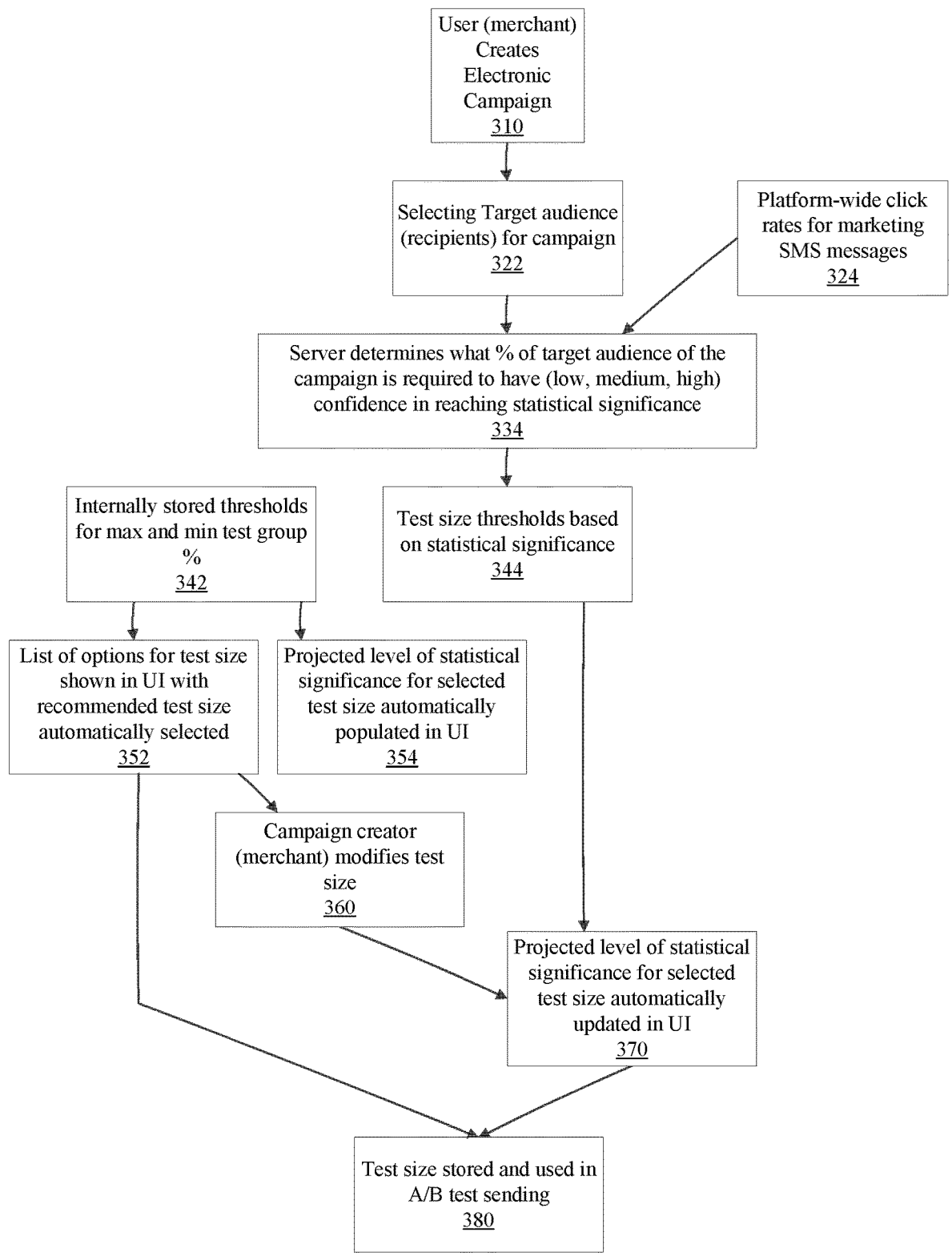
FIG. 3 is a flow chart that includes steps of a method for using information from a mobile message campaign, account-level and platform-wide information about mobile message sending patterns and delays in sending, and statistical calculations to suggest a test size for the A/B test, as well as show guidance to the user (merchant) based on a currently selected test size, according to an embodiment.

FIG. 3 is a flow chart that includes steps of a method for using information from a mobile message campaign, account-level and platform-wide information about mobile message sending patterns and delays in sending, and statistical calculations to suggest a test size for the A/B test, as well as show guidance to the user (merchant) based on a currently selected test size, according to an embodiment. For embodiments, the currently selected test size may be a default suggested size or a different user-selected size.

A step 310 includes a user (merchant) creating an electronic campaign. As previously stated, for an embodiment, the electronic campaign is a mobile message campaign. For an embodiment, the server 101 may receive campaign inputs from the marketing manager (merchant) 140.

A step 322 includes selecting a target audience (recipients) for the campaign. As previously described, for an embodiment, the selection is made using information about mobile message recipients stored in the server and/or criteria defined by the user (merchant). For an embodiment, the user (merchant) selects the mobile message recipients directly. For an embodiment, the user (merchant) selects groups of mobile message recipients to send the mobile message to and groups of mobile message recipients to exclude from sending. For an embodiment, the user (merchant) defines criteria and the server automatically determines all mobile message recipients that match those criteria. For an embodiment, the server automatically determines the mobile message recipients based on criteria set by the server and/or the user (merchant).

A step 324 includes determining platform-wide click rates (customer actions) for marketing SMS messages. For an embodiment, these rates are determined by looking at a large group of marketing mobile messages, potentially informed by information associated with the mobile message templates or the user (merchant) account and aggregating across them. For an embodiment, the platform-wide click rate is determined by counting the total number of unique clicks on all mobile messages sent by all customers of the platform in the past 30 days and dividing by the total number of mobile messages sent by all customers of the platform in the past 30 days. For an embodiment, the platform-wide click rate is determined by determining all customers of the platform whose mobile message sending volume is within a user-specified threshold of the user (merchant) account's mobile message sending volume, then performing a calculation similar to the one previously stated. For an embodiment, the platform-wide click rate is determined by determining all mobile messages whose content is similar to the mobile message being sent, based on criteria automatically determined by the server, then performing a calculation similar to the one previously stated.

A step 334 includes the server 101 determining what percentage of the target audience (recipients) of the campaign is required to have (low, medium, high) confidence in reaching a statistical significance. For an embodiment, this is determined based on information associated with the campaign, the platform-wide click rates determined in step 324, user-specified settings, and statistical calculations. For an embodiment, the server uses the platform-wide click rate to perform a statistical power calculation which determines the minimum sample size needed to have a low (e.g. 66%), medium (e.g. 80%), or high (e.g. 90%) threshold of statistical confidence in reaching a statistically significant result, then determines what percentage of the campaign's test size (as calculated in step 322) those thresholds correspond to. For an embodiment, the server uses the platform-wide click rate to perform a statistical power calculation which determines the minimum sample size needed to have a low, medium, or high threshold of statistical confidence in reaching a statistically significant result, where each threshold is inputted by the user (merchant), then determines what percentage of the campaign's test size (as calculated in step 322) those thresholds correspond to.

A step 344 includes determining test size thresholds based on statistical significance. For an embodiment, this is determined based on the thresholds computed in step 334 and information associated with the campaign. For an embodiment, the test size thresholds based on statistical significance are the nearest whole number to the exact numbers computed in step 324. For an embodiment, the test size thresholds are the nearest whole number to the exact numbers computed in step 324 that lies above and below thresholds specified by the user or determined by the server, e.g. no threshold can result in a test size that is smaller than 5% of the overall number of mobile message recipients or larger than 90% of the overall number of mobile message recipients.

A step 342 includes retrieving internally stored thresholds for maximum and minimum test group percentages.

A step 352 includes listing options for test size shown, for example, in a UI (user interface) with recommended test size automatically selected. For an embodiment, this listing of option is guidance provided to the merchant and is an example of user-specified settings. For an embodiment, a user specifies the percentage of the total number of mobile message recipients that should be included in the test group via entering a percentage between 1 and 100 in a text box or on a slider, and the text box or slider is automatically pre-set to the threshold for high confidence in reaching statistical significance that was retrieved in step 344.

A step 354 includes projecting a level of statistical significance for selected test size automatically populated in the UI. For an embodiment, when the default setting described in step 352 is selected, the UI shows the merchant a message indicating that the A/B test has a high chance of achieving a statistically significant result based on the currently selected test size.

A step 360 includes the campaign creator (merchant) modifying the test size based on the listing options for test size shown.

A step 370 includes a projected level of statistical significance for a selected test size being automatically updated in the UI. For an embodiment, if the campaign creator (merchant) decreases the test size from the automatic setting described in step 352 to the point that it is below the threshold for high confidence computed in step 344, the UI will display that there is now only a medium chance of achieving a statistically significant result based on the currently selected test size, and if they decrease it farther to the point that it is below the threshold for low confidence, the UI will display that there is a now only a low chance of achieving a statistically significant result based on the currently selected test size.

A step 380 includes storing the selected test size and using it in A/B test sending. For an embodiment, once the test size is chosen and saved, it is stored in the server. When the recipients associated with each template are determined at send time, this test size will be used to determine the percentage of the overall mobile message recipients to include in the test group, which will in turn inform the exact mobile message recipients associated with each template.

Figure 4:
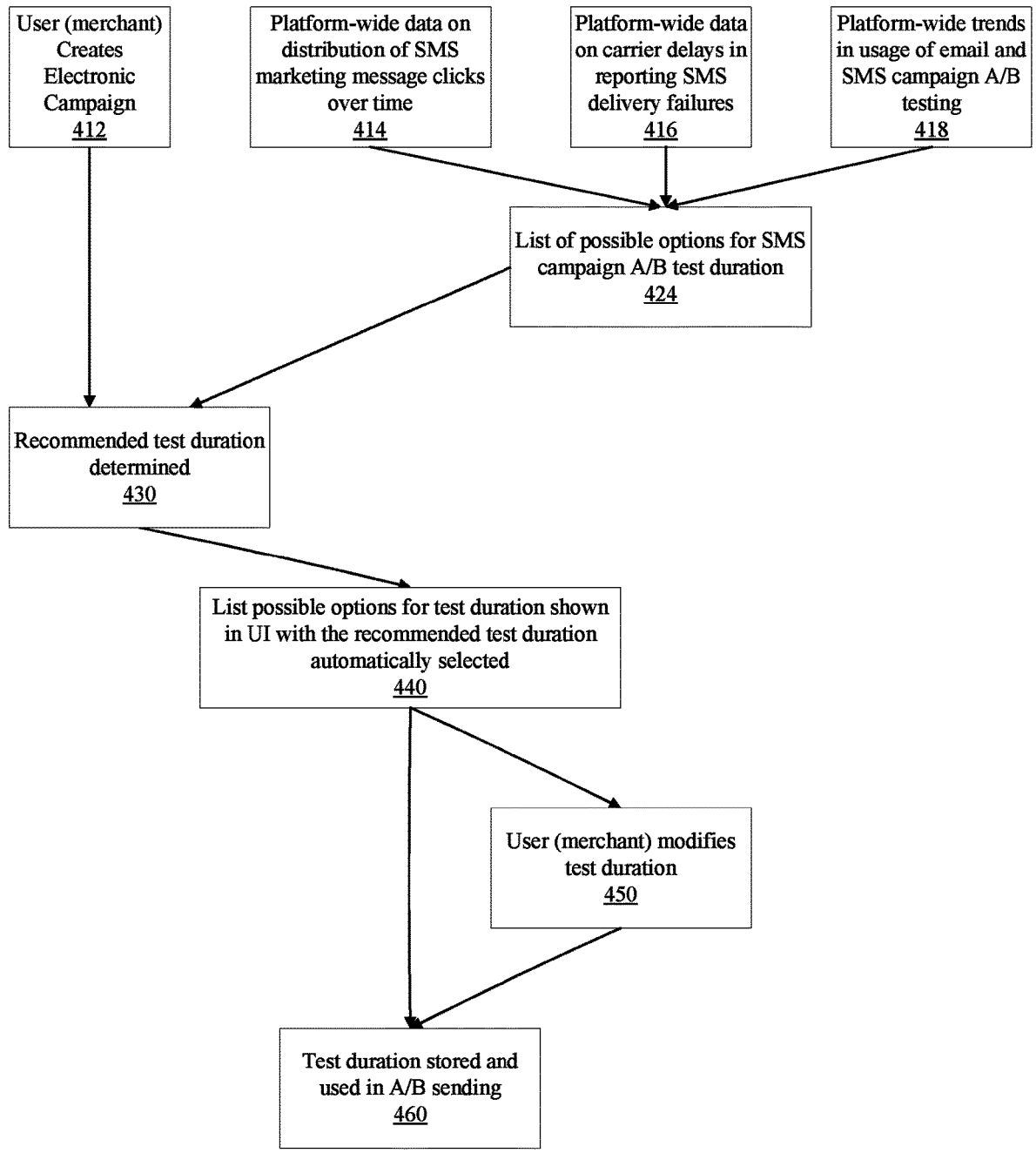
FIG. 4 is a flow chart that includes steps of a method for using information from a mobile message campaign, account-level and platform-wide information about mobile message sending patterns and delays in sending, and statistical calculations to suggest a test duration for A/B testing of templates, according to an embodiment.

FIG. 4 is a flow chart that includes steps of a method for using information from a mobile message campaign, account-level and platform-wide information about mobile message sending patterns and delays in sending, and statistical calculations to suggest a test duration for A/B testing of templates, according to an embodiment.

A step 412 includes a user (merchant) creating an electronic campaign.

A step 414 includes determining platform-wide data on distributions of SMS (mobile message) marketing message clicks (customer actions) over time. For an embodiment, this is similar to step 324 except an aggregated measure of the amount of time between the message being received and the message being clicked is additionally determined.

A step 416 includes determining platform-wide data on carrier delays in reporting SMS delivery failures. For an embodiment, this involves observing the amount of time between when a mobile message is sent and when the mobile carrier reports that an SMS failed to be delivered, then aggregating across many messages similar to step 414. This is largely based on the carrier.

A step 418 includes determining platform-wide trends in usage of email and SMS campaign A/B testing. For an embodiment, this involves looking at the server-generated and user-specified options in many tests. For an embodiment, trends in the time duration selected by users is observed across the platforms to inform the server whether there is a need to add time duration options (e.g. if users are selecting longer and longer options, the server may need to add options that are longer) need to be added. For an embodiment, the additions of time durations is performed dynamically.

A step 424 includes listing possible options for SMS campaign A/B testing duration based on the platform-wide data on distributions of SMS (mobile message) marketing message clicks (customer actions) over time, the platform-wide data on carrier delays in reporting SMS delivery failures, and the platform-wide trends in usage of email and SMS campaign A/B testing.

A step 430 includes determining a recommended test duration. For an embodiment, determining a recommended test duration is based on the information gathered in steps 414, 416, and 418, as well as information associated with the campaign. For an embodiment, the recommended test duration is the smallest whole number of hours larger than the average amount of time it takes for a specified percentage of all mobile message clicks to occur (for example, if 70% of all mobile message clicks occur within 2.5 hours, suggest 3 hours). For an embodiment the recommended duration is the smallest whole number of hours larger than the average amount of time it takes for a specified percentage of all mobile message clicks to occur and also larger than the average amount of time it takes for a specified percentage of failed delivery events to be reported (e.g. if 70% of all mobile message clicks occur within 2.5 hours and 95% of all failed delivery events are reported within 3.3 hours, suggest 4 hours). For an embodiment, the recommended test duration is the closest whole number to the average test duration chosen by users within the past 24 hours.

A step 440 includes list possible options for test durations shown in UI with recommended test duration automatically selected. For an embodiment, the list of possible options for the test durations is included within the guidance given to the marketing manager.

A step 450 includes the user (merchant) modifying the test duration. For an embodiment, the user (merchant) modifying the test duration is included within the user-selected configurations.

A step 460 includes storing the test duration and using the test duration in A/B testing of templates.

Figure 5:
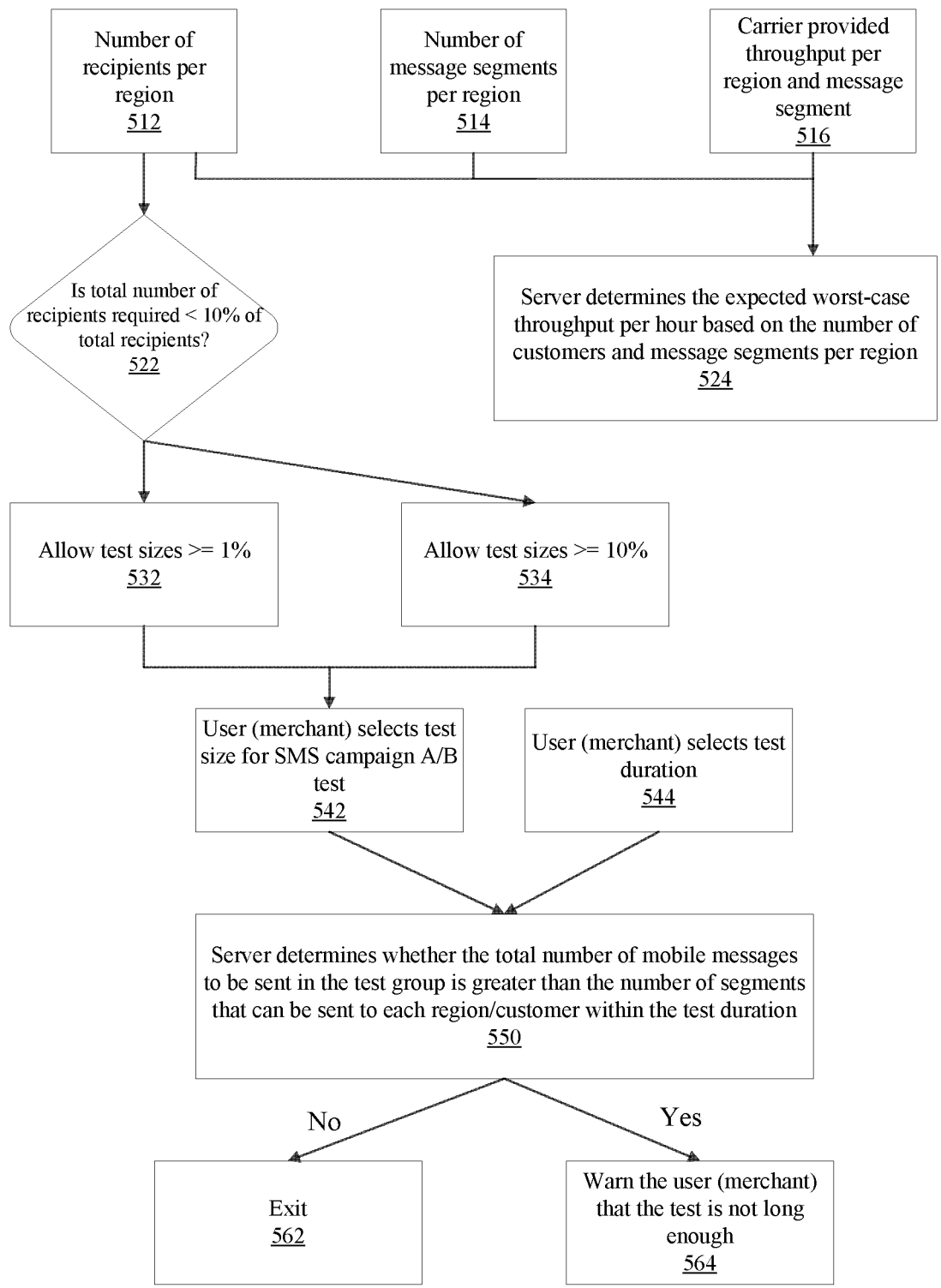
FIG. 5 is a flow chart that includes steps of a method for accounting for large campaigns or accounts with low bandwidth and how warnings are provided if the time needed to send the test group for an A/B test is likely to be too long compared to the chosen test duration, according to an embodiment.

FIG. 5 is a flow chart that includes steps of a method for accounting for large campaigns or accounts with low bandwidth and how warnings are provided if the time needed to send the test group for an A/B test is likely to be too long compared to the chosen test duration, according to an embodiment. Embodiments of FIG. 5 provide more detail of how the methods of FIGS. 3 and 4 account for large campaigns.

A step 512 includes determining a number of recipients per region. For an embodiment, the number of recipients per region is based on information associated with the mobile message templates, including the intended recipients of the mobile message. For an embodiment, the server determines this automatically by looking up information in a database.

A step 514 includes determining a total number of mobile messages to be sent per region. For an embodiment, the total number of mobile messages to be sent is automatically determined by the server based on the content of the message, the information determined in step 512, and knowledge of different rules for the lengths of mobile messages in different regions. (e.g., the exact same text can equal 1 message in the US and 1 message in Canada).

A step 516 includes determining carrier provided throughput per region and message segment. For an embodiment, throughput per region refers to the number of messages it is possible to send in a given time. For an embodiment, step 516 occurs automatically, with the estimated carrier throughput determined by the server based on information about the account (e.g., different accounts can have different types of phone numbers (e.g. short code, toll free, alphanumeric) that have different throughput limits, some accounts may pay a premium for higher throughput allowances) and knowledge of the throughput granted to us by our SMS sending provider (Twilio), which in turn is determined by the throughput provided by the carriers themselves (and therefore can vary by geolocation).

A step 522 includes determining whether the total number of recipients required is greater than a predetermined percentage (such as, 10%) of the total number of recipients.

A step 524 includes the server 101 determining the expected worst-case throughput per hour based on the number of customers and message recipients per region. For an embodiment, this is determined based on the information from steps 512, 514, and 516. For example, the expected worst-case throughput per hour can be calculated by computing the throughput in the scenario where all the mobile messages in the slowest region (i.e. the region with the lowest throughput) are sent before any other messages are sent, then all the mobile messages in the next-slowest region, etc.

A step 532 includes allowing test size of greater or equal to 1% (or another preselected percentage).

A step 534 includes allowing test size of greater or equal to 10%. (or another preselected percentage). It is to be understood that for at least some embodiments, steps 522, 532, and 534 are not necessary, but are included here as a description of an embodiment. For an embodiment, the steps of the method can include proceeding directly from step 512 to step 542.

A step 542 includes the user (merchant) selecting a test size for the mobile message (SMS) campaign A/B testing.

A step 544 includes the user (merchant) selecting a test duration for the mobile message (SMS) campaign A/B testing.

A step 550 includes the server 101 determining whether the total number of mobile messages to be sent in the test group is greater than the number of segments that can be sent to each region/customer within the test duration. For an embodiment, this is done by comparing the number of mobile messages that can be sent during the test duration under the worst-case estimate computed in step 524 to the number of mobile messages that need to be sent (which is directly known based on step 542).

A step 562 includes exiting when the number of message segments required to run the test is not greater than the number of segments that can be sent to each region/customer. For an embodiment, this means no warning is surfaced and the user is free to send the test under the current settings.

A step 564 includes warning the user (merchant) that the test is not long enough when the number of message segments required to run the test is greater than the number of segments that can be sent to each region/customer. For an embodiment, this warning is included within the guidance given to the user/merchant.

Figure 6:
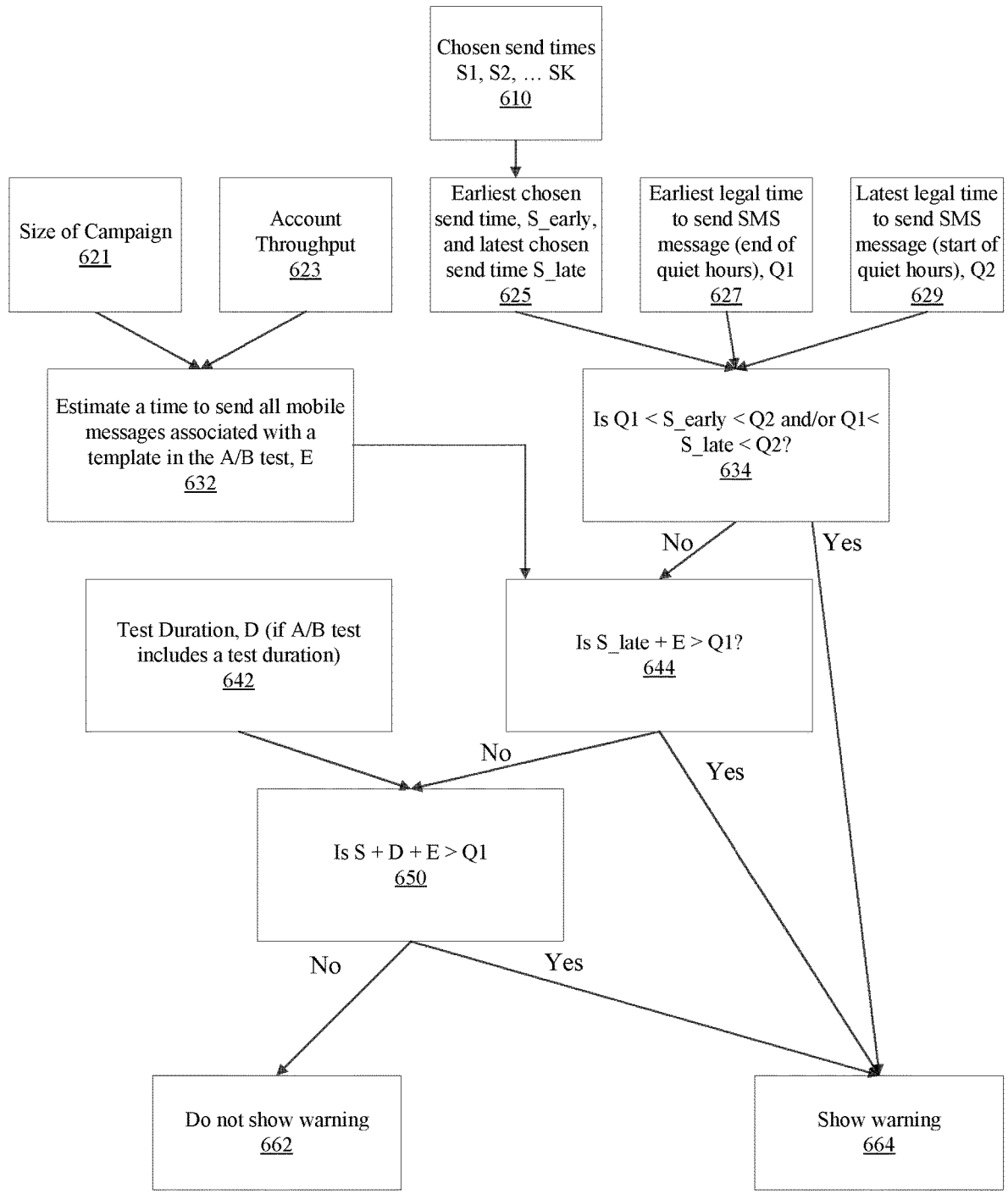
FIG. 6 is a flow chart that includes steps of a method for using the information from a mobile message campaign and knowledge of legal regulations about sending marketing mobile messages to provide warnings if any portion of the mobile message campaign is expected to be sent during "quiet hours," which risks noncompliance with regulations, according to an embodiment.

FIG. 6 is a flow chart that includes steps of a method for using the information from a mobile message campaign and knowledge of legal regulations about sending marketing mobile messages to provide warnings if any portion of the mobile message campaign is expected to be sent during "quiet hours," which risks noncompliance with legal regulations, according to an embodiment.

A step 610 includes determining chosen send times S1, S2, . . . SK of the mobile messages.

A step 621 includes determining the size of the campaign.

A step 623 includes determining an account throughput

A step 625 includes determining the earliest chosen send time (S_early) and the latest chosen send time (S_late).

A step 627 includes determining the earliest legal time to send a mobile (SMS) message (end of quiet hours), Q1.

A step 629 includes determining the latest legal time to send a mobile message (start of quiet hours), Q2.

A step 632 includes estimating a time to send all mobile messages associated with a template in the A/B test, E.

A step 634 includes determining whether Q1 is less than S_early and S_early is less than Q2, and/or whether Q1 is less than S_late and S_late is less than Q2. For an embodiment, this includes determining whether the times that are chosen by themselves violate quiet hours, before taking the time needed to send the mobile messages into account.

If the condition of step 634 is no, then a step 644 includes determining whether S_late+E is greater than Q1. For an embodiment, this includes checking whether the test is expected to send messages during quiet hours after factoring in the time needed to send the mobile messages.

A step 642 includes determining a test duration D is the proposed A/B test includes a test duration.

If the condition of step 644 is no, then a step 650 includes determining whether S+D+E>Q1. For an embodiment, this includes checking whether the test is expected to send messages during quiet hours after factoring in the time needed to send the mobile messages and the time needed to elapse to determine the winner, and to send the winner.

If the condition of step 650 is no, then a step 662 includes a warning not being shown to the user (merchant). That is, for an embodiment, if no messages are expected to be sent in quiet hours, after considering the times that the mobile messages are scheduled, the amount of time it takes to send the mobile messages, and the amount of time needed to wait to determine the winner of the test and then send the winner. This is an example of guidance being given to the user/merchant via indicating that their settings are valid.

If the condition of either step 634, step 644, or step 650 is yes, then a step 664 includes showing the user (merchant) a warning. That is, for an embodiment, the warning is shown to the user (merchant) if any messages are expected to be sent during quiet hours. For an embodiment, the warning is included within the guidance given to the user/merchant.

FIG. 7 is a flow chart that includes steps of a method for assigning mobile message recipients to templates of a mobile message for automated testing of the templates, according to an embodiment. A first step 710 includes generating, by a server, at least a first template of the mobile message and a second template of the mobile message, each of the first template and the second template having at least a different content or a different send time. A second step 720 includes determining, by the server, information associated with the mobile message. A third step 730 includes identifying and sending, by the server, guidance (including warnings) (NEW) for a marketing manager (merchant) based on the information associated with the mobile message. A fourth step 740 includes receiving, by the server, user-selected configurations from the marketing manager (merchant) in response to the guidance. A fifth step 750 includes assigning, by the server, a first respective group of mobile message recipients to the first template of the mobile message and a second respective group of mobile message recipients to the second template of the mobile message, wherein the assigning is based on the information associated with the mobile message and the user-selected configurations received from the marketing manager (merchant).

An additional step not shown in FIG. 7 includes sending, by the server, the mobile message according to the first template to the first respective group of mobile message recipients, and according to the second template to the second respective group of mobile message recipients. As previously described, for an embodiment, the assigning facilitates greater than a statistical threshold of fairness of the testing across multiple merchants and multiple mobile message recipients of the mobile message.

An additional step not shown in FIG. 7 includes testing the success of the different templates, including determining automatically, by the server, whether the first template of the mobile message has a statistical advantage over the second template of the mobile message through the testing.

While the described embodiments are focused on assigning template to mobile message recipients, it is to be understood that the described embodiments could be directed to recipients of messages of WeChat®, WhatsApp®, push notifications, Facebook messenger @, Instagram® DMs, other social media platforms.

Figure 8:
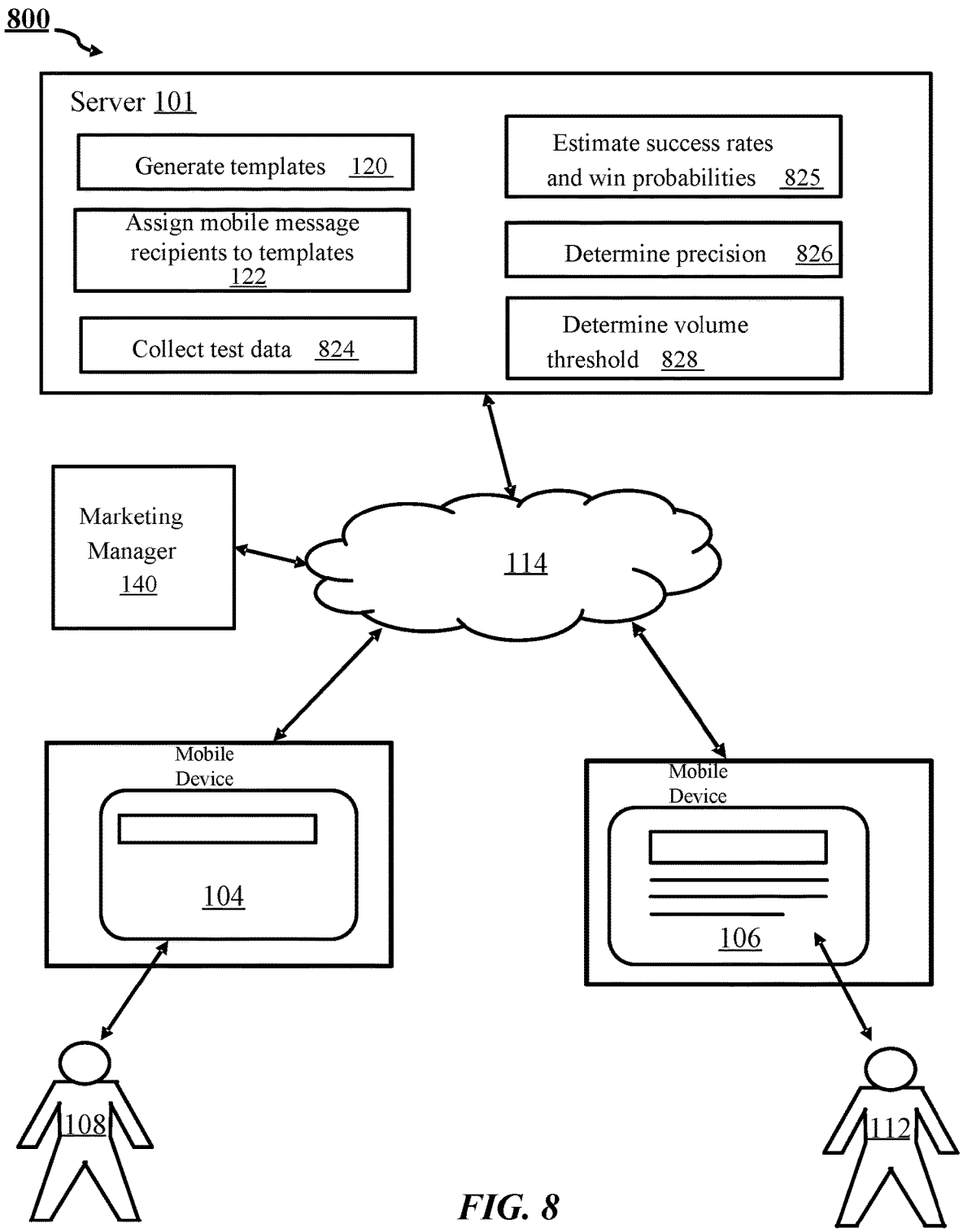
FIG. 8 shows a system for automated testing and selection of a template of a mobile message, according to an embodiment.

FIG. 8 shows a system 800 for automated testing and selection of a template of a mobile message, according to an embodiment. The system 800 includes a server 101. As previously described, for an embodiment, the server 101 is electronically connected through the network 114 to electronic mobile devices 104, 106 of mobile message recipients 108, 112. For an embodiment, the server 101 operates to generate 120 at least a first template of the mobile message and a second template of the mobile message each having different content or different send times. For at least some embodiments, the first template and the second template further include different displays. That is, mobile messages associated with the first template and the second template display mobile messages in varying ways. Though described here as the generation of a first template and a second template, it is to be understood that the server 101 operates to generate N templates that include the first template and a second template.

As previously described, for a marketing manager (server) 140 operates and manages an ecommerce website. For an embodiment, the marketing manager 140 includes a server of a business that operates to directly control the ecommerce website. For an embodiment, the marketing manager 140 includes a combination of the business and a third party to operate to control the ecommerce website. For an embodiment, the marketing manager 140 is a customer of the operator of the server 101. For an embodiment, the marketing manager 140 is a combination of the customer of the operator of the server 101 and a third party (such as, a Shopify platform).

For an embodiment, each of the N templates includes a set of data objects that combine to represent a structure of a mobile message. As described, the first and second templates of the N templates of the mobile message each have a different content, a different send time, and/or a different behavior. The different displays of the mobile message can include a changing display, such as, movement or varying display intensity. Accordingly, the set of data objects of each of the first and second templates combine to represent a structure of mobile message having a different content, different send times, or different behavior of the mobile messages. For an embodiment, the structure of the mobile message includes the content, the send time, or the behavior control. For an embodiment, the templates additional include information pertaining to testing of the mobile message(s). The additional information can include, for example, a test name, a description of test (makes it easier to remember what is being tested), an ending date, and/or specific settings that correspond to statistical significance criteria. For an embodiment, the additional information pertaining to the testing combined with the data for the templates define a test.

For an embodiment, the server 101 operates to assign 122 a respective group of mobile message recipients planned mobile message recipients to the first template of the mobile message and the second template of the mobile message. For an embodiment, the planned mobile message recipients are mobile message recipients that are available for testing, and available for receiving mobile messages after the testing has been completed. That is, for an embodiment, a subset of the planned mobile message recipients is selected for receiving mobile messages according to multiple templates for testing. Once the testing has been completed, a winning template can be used for a least a portion of the remaining planned mobile message recipients that were not included within the testing. For an embodiment, the mobile message recipients are obtained by tracking information of mobile message recipients to the customer website managed by the marketing manager 140. For an embodiment, the mobile message recipients include recent mobile message recipients. For an embodiment, recent mobile message recipients include site mobile message recipients that have visited the customer website within a predetermined time-period. For an embodiment, mobile message recipients include a selected number of most recent customer website visitors. For an embodiment, recent site visitors include mobile message recipients since a specific event. For an embodiment, the specific event may include, for example, a large change in the settings of a template test. For an embodiment, the assigning is random with equal probabilistic distributions within each geographical region that mobile messages of the test are sent. For example, the mobile message may be sent to mobile message recipients from N different geographical regions. For an embodiment, an equal number (or near equal) of mobile messages is sent to each of the geographical regions, but randomly sent to the mobile message recipients within each of the regions. For an embodiment, the assigning is deterministic but equally distributed within each of the geographical regions. For example, a first template 1 can be assigned to a first member of the list of planned mobile message recipients, a second template 2 can be assigned to a second member of the list of planned mobile message recipients, and the first template can be assigned to a third member of the list of planned mobile message recipients, and so on.

For an embodiment, the server 101 further operates to determine automatically whether the first template of the mobile message is statistically more advantageous than the second template of the mobile message. For an embodiment, the server 101 operating to determine the statistical advantage includes collecting 824 test data from testing including qualification for recipient actions, and successes of the first template of the mobile message and the second template of the mobile message. Generally, a mobile message with a statistical advantage is better at soliciting a desired response from a mobile message recipient that receives the mobile message.

Qualification for Sending

For at least some embodiments, an eligibility of the mobile message recipient is determined dynamically by a combination of a geolocation of the mobile message recipient, transactional (for example, purchase confirmation, delivery confirmation) vs. marketing purpose of the mobile message, and recency of the last marketing mobile or email message received. For example, only mobile message recipients who have not received a marketing email and/or marketing mobile message within the past 24 hours (or some other predetermined or adaptive time period X) are eligible to receive this message. For an embodiment, the planned mobile message recipients are determined when a mobile message is scheduled for transmission to the mobile message recipients. For an embodiment, when the mobile message is sent, the time that each planned mobile message recipient received their most recent marketing mobile message is determined, and only those mobile message recipients that have not received a marketing mobile message in the past X hours are deemed eligible mobile message recipients.

Successes

For an embodiment, successes include the mobile message recipient(s) carrying out a main action that a mobile message is intended to elicit, such as, for example, clicking a link in the mobile message (potentially embedded in an image), or making a purchase on the website linked to in the mobile message. Further, the mobile message recipients receive the mobile messages via mobile device, such as, a cellular phone. Accordingly, physical actions of the mobile message recipients can be tracked to determine whether the mobile message recipient(s) carried out a main action that a mobile message is intended to elicit. That is, sensors, such as, location sensors, such as, GPS (global positioning system) sensors, and/or motion sensors (such as, accelerometers, gyroscopes, and/or magnetic sensors) can be used to track the locations and actions of the mobile message recipient(s) to determine whether the mobile message recipient(s) performed the main action or another action. Sensed action can include, for example, sensing that the mobile message recipient(s) deviated in behavior (sensed motion) or location. The sensed behavior or sensed location can be used, for example, to determine that the mobile message recipient(s) visited a physical location of the merchant of the marketing manager server 140. Further, actions of the mobile message recipient(s) can be sensed by detecting motions of the mobile message recipient(s) that indicated that the mobile message recipient(s) perused the physical location of the merchant and picked up and physically looked at a product. Further, actions of multiple mobile message recipient(s) can be sensed to determine that different mobile message recipient(s) interacted and caused behavior changes between the mobile message recipient(s) and potentially others. The sensed location and actions of mobile recipients can be used to establish relationships between different recipients. Once relationships are established, interactions between different of the related mobile recipients can be sensed and determined to be caused by reception of a mobile message. Such interactions can be determined to be a main action that a mobile message is intended to elicit.

For at least some embodiments, the server 101 further operates to generate estimates 825 of success rates for the first template and the second template including applying an analysis method to the collected test data to determine a win probability difference between a win probability for the first template and a win probability for the second template and determining that the win probability difference is greater than a selected win threshold.

For at least some embodiments, the server 101 further operates to determine that a precision 826 of the estimates of the success rate is greater than a precision threshold, and determines that greater than a volume threshold 828 of test data has been collected.

For an embodiment, the statistical advantage is declared for the first template when the selected win threshold, the precision threshold, and the volume threshold are all met. That is, the first template is determined to perform statistically better than the second template when the selected win threshold, the precision threshold, and the volume threshold are all met. The decision may be made by the marketing manager to favor the first template over the second template based on the statistical advantage demonstrated by the first template over the second template. For an embodiment, the server 101 automatically operates to favor the first template over the second template based on the statistical advantage demonstrated by the first template over the second template.

For at least some embodiments, the selected win threshold, the precision threshold, and the volume threshold are all preselected. For an embodiment, at least one of the selected win threshold, the precision threshold, and the volume threshold are preselected, and at least one other of the selected win threshold, the precision threshold, and the volume threshold is adaptively adjusted. For an embodiment, the selected win threshold, the precision threshold, and the volume threshold are all adaptively adjusted.

Selected Win Threshold

For an embodiment, the selected win threshold is preselected based on best practices established over time. For an embodiment, the selected win threshold is adaptively selected based on input or feedback from the mobile message recipients (customers of the marketing manager). For an embodiment, the selected thresholds are determined through prior simulation. For an embodiment, the selected win threshold is changed over time based on at least one of a plurality of factors. The factors can include preferences of the website operator (that is, directly selecting a threshold (if the website operator has a level of statistical knowledge) or the website operator choosing how "aggressive" they want to be to find a winner early or how "sure" they want to be in an outcome], a detected anomaly (that is, for example, an error in data collection), or pattern in collected data (that is, a very spiky (variations of greater than a threshold amount) visit volume pattern on a website that makes the website operator want to regularize to avoid extreme spikes having an effect that is too large). For an embodiment, the selected win threshold is adaptively adjusted based on one or more of these listed factors.

Precision Threshold

For an embodiment, the precision threshold is preselected based on predicted or simulated false positive and false negative rates based on a number of received messages and successes that are realistic, wherein realistic successes is based on historical data for a marketing mobile message sent to mobile message recipients of the customer). For an embodiment, the precision threshold is adaptively selected based on data from data of a particular website, or the data of websites that are similar (for example, a website that has similar observed patterns in business metrics and/or that sells similar products or is in a similar industry vertical, and/or a website with a similar behavior (for example, frequency, size of messages, type of messages (e.g. transactional vs. marketing)) in sending mobile messages.

Volume Threshold

For an embodiment, the volume threshold is preselected based on predicted or simulated false positive and false negative rates based on a number of message recipients and successes that are realistic, wherein realistic successes is based on historical data for a mobile message of the mobile message recipient. For an embodiment, the volume threshold is adaptively selected based on data from data of a particular website, or the data of websites that are similar (for example, a website with a similar amount of mobile message recipients). For an embodiment, the volume threshold is adaptively selected based on data from data of a particular website, or the data of websites that are similar (for example, a website that has similar observed patterns in business metrics and/or that sells similar products or is in a similar industry vertical a website with a similar amount of or pattern in site visitor traffic.

For an embodiment, the generating of the estimates, checking the precision, and checking the volume threshold, appear to be performed simultaneously in real-time. That is, the operations are performed so that the performance appears simultaneous to a website manager and a mobile message recipient.

As previously described, for an embodiment, the server 101 further operates to generate estimates 825 of success rates for the first template and the second template including applying an analysis method to the collected test data to determine a win probability difference between a win probability for the first template and a win probability for the second template and determine that the win probability difference is greater than a selected win threshold. For an embodiment, the analysis method includes generating a win probability, wherein the win probability represents a probability that a template variation currently leading the testing has a higher success rate than other variations after accounting for random chance. Example analysis methods include a Bayesian posterior probability or a frequentist p-value. For an embodiment, the random chance is accounted for by using at least one of these two methods.

At least some embodiments further include determining that a conversion rate is similar with conversion rates of marketing mobile messages, as opposed to transactional mobile messages or other types of marketing messages. However, for an embodiment, the applied analysis method is optimized for conversion rates similar with conversion rates of those seen in mobile messages. For example, for a Bayesian prior that is constructed using historical mobile message data. For an embodiment, this is specific to the expected data setting for an individual mobile message, using factors such as success rates on mobile messages with similar behavior, send time, and content, success rates on for mobile messages from the same site or similar sites.

Figure 9:
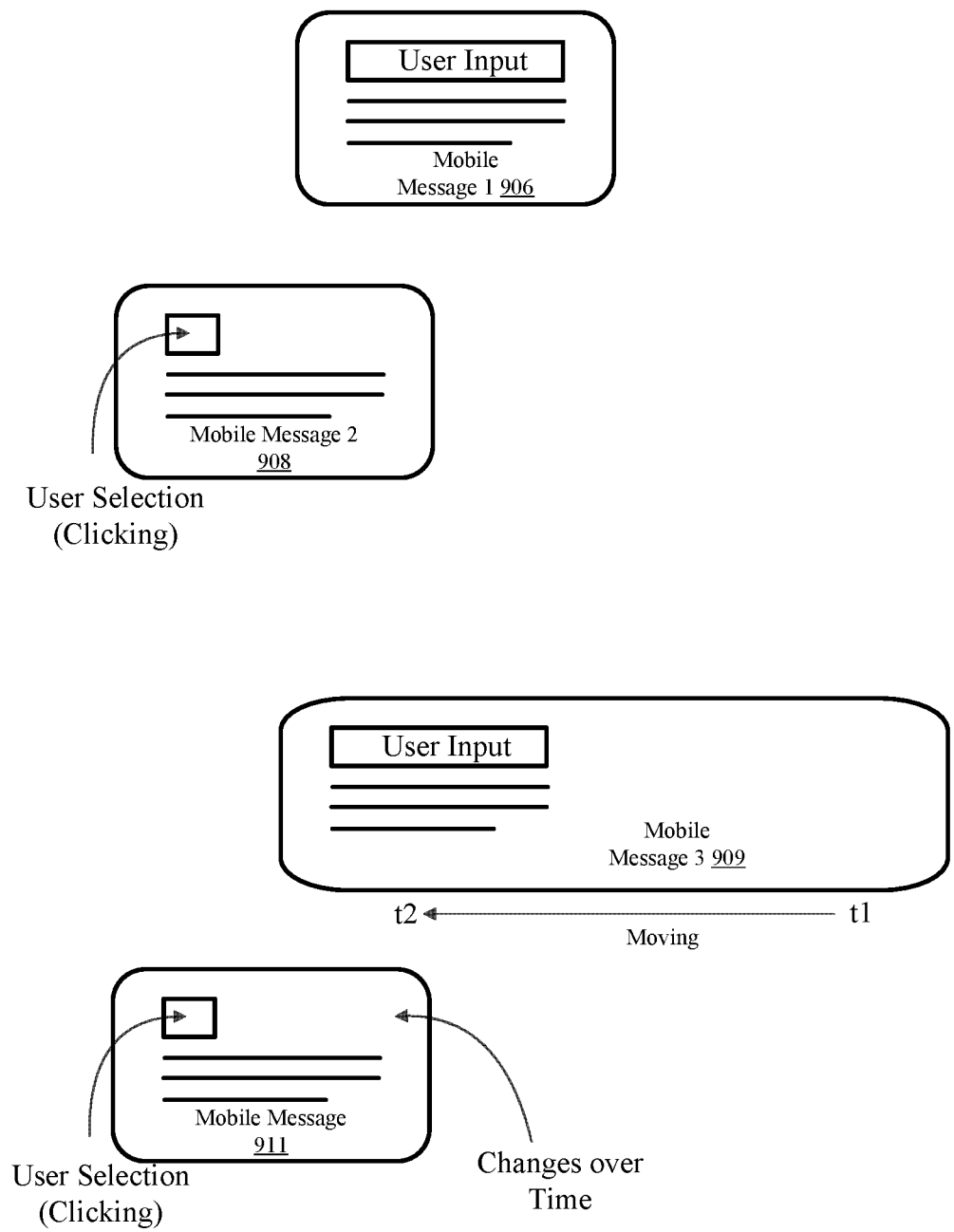
FIG. 9 shows mobile messages that require an input, according to an embodiment.

FIG. 9 shows mobile messages that require an input, according to an embodiment. A first display of a mobile device of a mobile message recipient includes a mobile message 906 that requires an input from a user (mobile message recipient) and a mobile message 908 that requires a user input through, for example, a selection, such as, through a click. A second display includes a mobile message 909 that changes on the display between times t1 and t2, and a mobile message 911 that is delivered a time t3 after the mobile message has been sent. Clearly, other mobile messages having different content, send times, and behavior can be utilized.

For an embodiment, the mobile message includes a file configured to receive an input from a mobile message recipient. For an embodiment, the required input includes at least one or more of the customers (site visitor) clicking to a different page, or the customer entering information. However, as previously mentioned, sensors of mobile devices of the mobile message recipients can be utilized to determine or detect actions of the mobile message recipients that indicate changes in behavior of the mobile message recipient due to receiving the mobile messages of the different templates.

Figure 10:
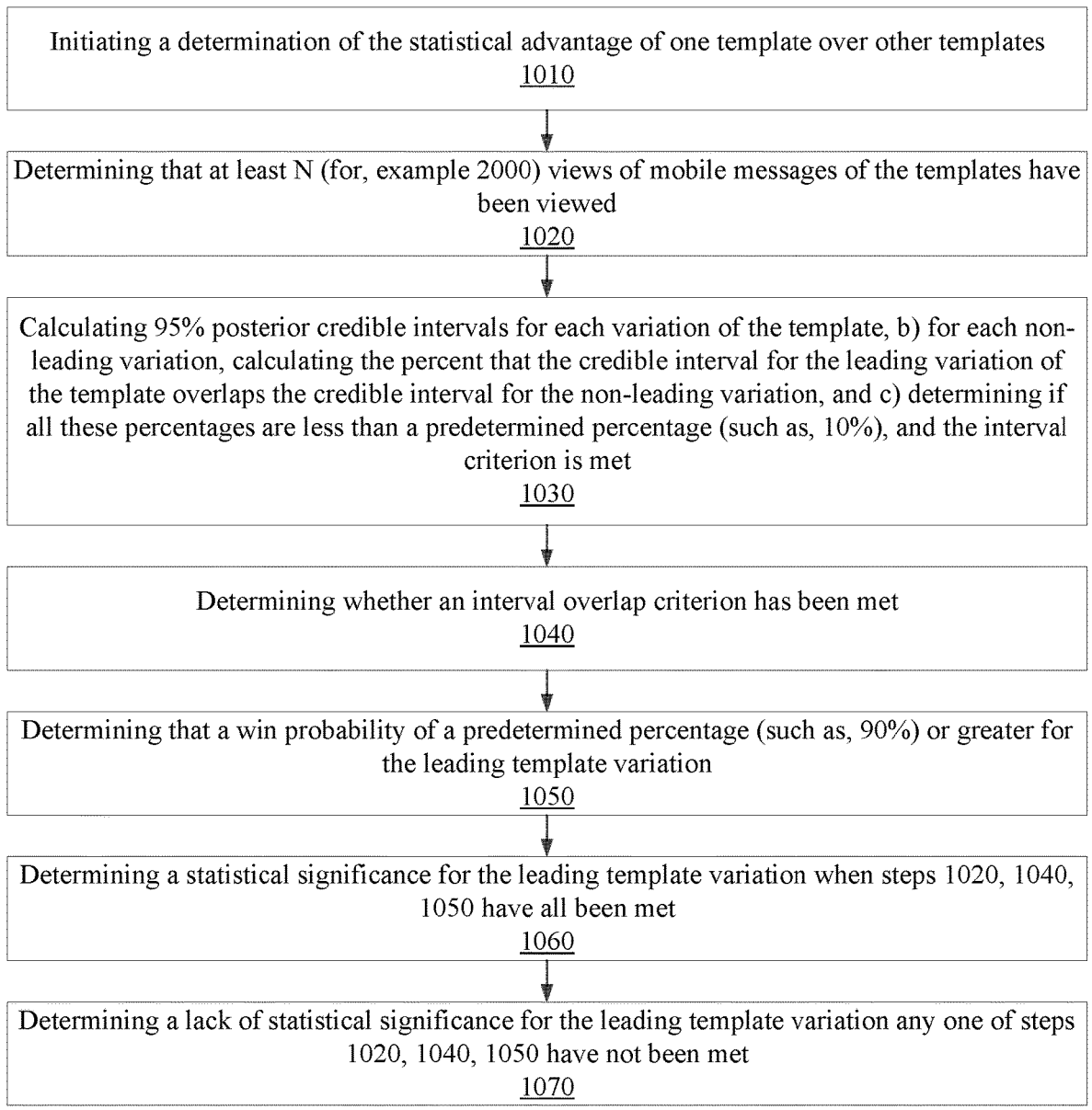
FIG. 10 is a flow chart that includes steps of a method for determining a statistical advantage of one template over another template, according to another embodiment.

FIG. 10 is a flow chart that includes steps of a method for determining a statistical advantage of one template over another template, according to another embodiment.

As previously described, for an embodiment, the statistical advantage is declared for the first template when the selected win threshold, the precision threshold, and the volume threshold are all met. A first step 1010 of the flow chart of FIG. 10 includes initiating a determination of the statistical advantage of one template over other templates. A second step 1020 includes determining that at least N (for example, 2000) mobile messages of the templates have been received. The second step 1020 can be equated with the previously described volume threshold determination.

A third step 1030 includes a) calculating 95% posterior credible intervals for each variation of the template representing the range of values that the success rate for this template is likely (in particular having a 95% level of confidence that the interval contains the true value of the success rate if infinite data is gathered) to take, and incorporating both the information contained in the Bayesian prior and the collected data), b) for each non-leading variation, calculating the percent that the credible interval for the leading variation of the template overlaps the credible interval for the non-leading variation (that is, intervals that have been defined above may overlap. That is, if one interval is (0, 10) and the second interval is (5, 15), then the percent overlap would be 50%), and c) determining if all these percentages are less than a predetermined percentage (such as, 10%), and the interval criterion is met. For an embodiment, step 1030 is a necessary step to compute the precision threshold.

A fourth step 1040 includes determining whether an interval overlap criterion has been met. For an embodiment, the interval overlap criterion is true (met) if the percent overlap calculated in step 1030 is less than a pre-selected precision threshold.

A fifth step 1050 includes determining a win probability of a predetermined percentage (such as, 90%) or greater for the leading template variation. That is, the win probability threshold is satisfied.

A sixth step 1060 includes determining a statistical significance for the leading template variation when steps 1020, 1040, 1050 have all been met.

A seventh step 1070 includes determining a lack of statistical significance for the leading template variation any one of steps 1020, 1040, 1050 have not been met.

FIG. 11 is a flow chart that includes steps of a method of determining a precision estimate of a success rate of a template, according to an embodiment.

As previously described, at least some embodiments include checking that the precision of the estimates of the success rate is greater than a precision threshold. For an embodiment, checking that the precision of the estimates of the success rate is greater than a precision threshold includes (1110) determining the range of values that the N success rates of N different templates could take given a pre-defined level of random chance, For an embodiment, this includes (1120) comparing a fraction of credible intervals that are overlapping, wherein credible intervals include a range of values that the success rate is likely to fall within after accounting for random chance. and 1130 checking that these ranges of values indicate a sufficiently higher success rate for the leading variation after accounting for random chance. That is, step 1130 includes determining whether the overlap fraction is small (below a certain threshold)

Figure 12:
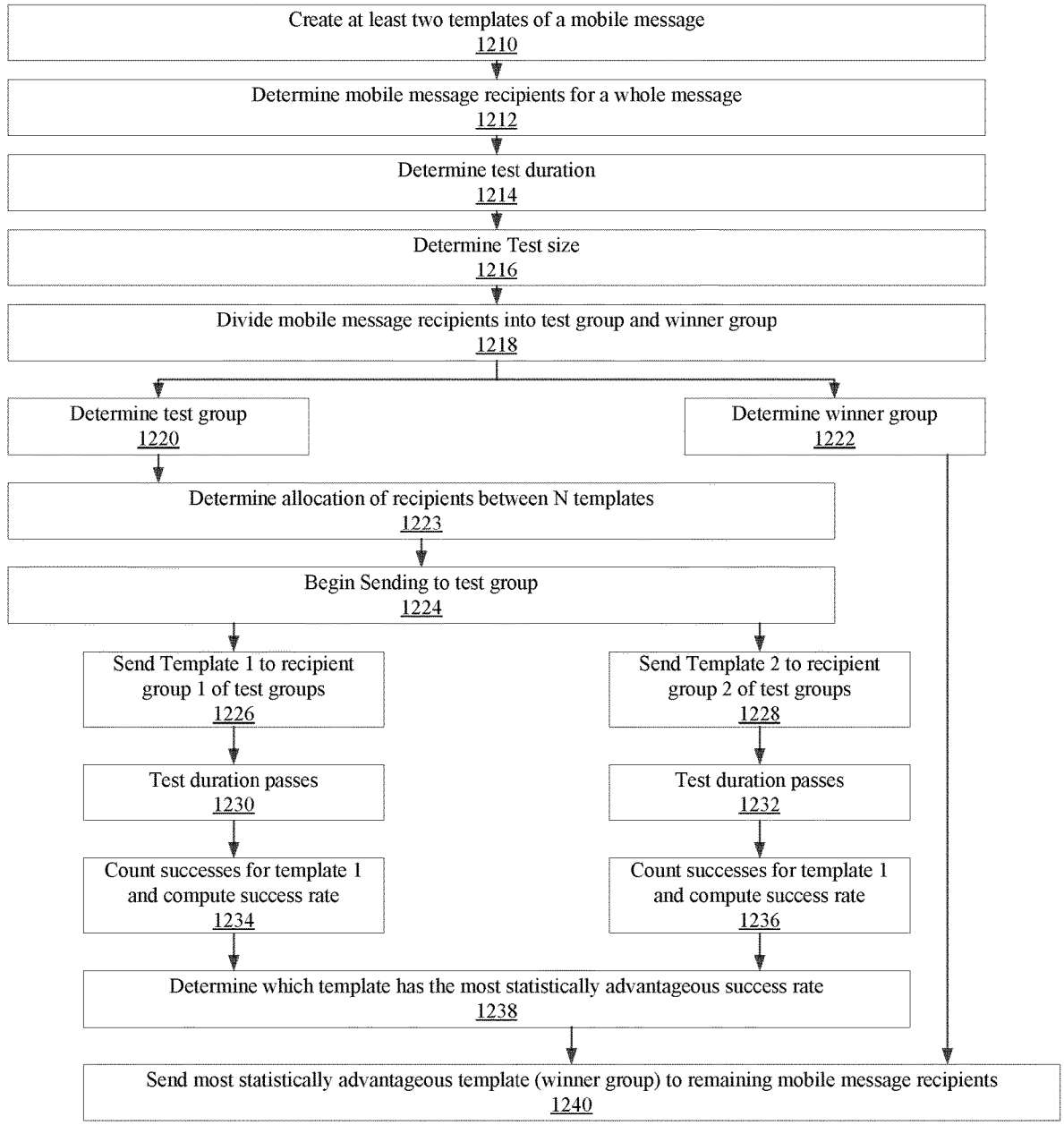
FIG. 12 is a flow chart that includes steps of a method for assigning a respective group of mobile message recipients to a first template of a mobile message and a second template of the mobile message, according to an embodiment.

FIG. 12 is a flow chart that includes steps of a method for assigning a respective group of mobile message recipients to a first template of a mobile message and a second template of the mobile message, according to an embodiment.

A step 1210 includes creating at least two templates of a mobile message. As previously described, multiple templates are created, wherein each of the templates include a set of data objects that combine to represent a structure of a mobile message. As described, the first and second templates of N templates of the mobile message each have a different content, a different send time, or a different behavior. Accordingly, the set of data objects of each of the first and second templates combine to represent a structure of mobile message having a different content, send times, and/or different behaviors. For an embodiment, the structure of the mobile message includes the content, the send time, and/or the mobile message behavior. For an embodiment, the templates additional include information pertaining to testing of the mobile message(s). The additional information can include, for example, a test name, a description of test (makes it easier to remember what is being tested), an ending date, and/or specific settings that correspond to statistical significance criteria. For an embodiment, the additional information pertaining to the testing combined with the data for the templates define a test.

A step 1212 includes determining mobile message recipients for a whole message. That is, the list of all planned mobile message recipients is determined.

A step 1214 includes determining a test duration. For an embodiment, the test duration is determined based on one or more of an intended send time of the mobile messages, legal restrictions on send times of mobile messages, a rate of change of data over time in similar tests, and/or a test size. As described above, this is per user selection received after the user is provided with the guidance.

A step 1216 includes determining a test size. For an embodiment, the test size is determined based on at least one of the intended send time of the mobile messages, the test duration of the mobile messages, the rate of change of data over time for similarly sized tests, the success rate of similar mobile messages, the content, behavior, and/or send times of the templates of the mobile messages included in the testing of the templates. As described above, this is per user selection received after the user is provided with the guidance.

A step 1218 includes dividing the mobile message recipients into a test group 1220 and a winner group 1222. For an embodiment, the planned mobile message recipients include all of the mobile message recipient that the mobile messages. For an embodiment, the test group and the winner group are a mutually exclusive groups of mobile message recipients. Further, for an embodiment, the test group and the winner group are an exhaustive (that is, account for the entire group of planned mobile message recipients between the two) division of the planned mobile message recipients. For an embodiment, the test group are selected for testing and determining the winning template. For an embodiment, the winner group of mobile message recipients then receive mobile messages according to the winning template as determined by the testing of the multiple templates.

A step 1223 includes determining the allocation of recipients between N templates (wherein the N templates includes at least the first and second templates). For an embodiment, the allocating is per the above-described assigning. For an embodiment, the allocating is random with equal probabilistic distributions within each geographical region that the test is sent to. For example, the mobile message may be sent to mobile message recipients from N different geographical regions. For an embodiment, an equal number of mobile messages is sent to each of the geographical regions, but randomly sent to the mobile message recipients within each of the regions. As previously described, for an embodiment, the assigning is deterministic but equally distributed within each of the geographical regions. For example, a first template 1 can be assigned to a first member of the list of planned mobile message recipients, a second template 2 can be assigned to a second member of the list of planned mobile message recipients, and the first template can be assigned to a third member of the list of planned mobile message recipients, and so on.

A step 1224 includes sending the message according to the N templates to the test group.

Steps 1226, 1228 include sending the mobile message according to a template 1 and a template 2 of the N templates to a group 1 of the test group and a group 2 of the test group.

Steps 1230, 1232 include waiting for the determined test duration to pass. During the determined test duration actions of the mobile message recipients are tracked and monitored.

Steps 1234, 1236 include counting the successes of the mobile message sent to mobile message recipients of the group 1 and group 2 according to the template 1 and the template 2. As previously described, for an embodiment, successes of the mobile messages generally include determining how many of the mobile message recipients of the mobile messages are tracked or determined to have performed a task of the mobile message. For an embodiment, the tracked and monitored activities of the mobile message recipients are online activities. For an embodiment, mobile devices of the mobile message recipients are tracked, and the tracked and monitored activities include locations and motions of the mobile message recipients.

A step 1238 includes using the previously described embodiments for determining which of the templates has the statistically advantageous success rate. The template that has the statistically advantageous success rate can be designated as the winner or winning template.

A step 1240 includes sending the mobile message using the statistically advantageous success rate (winner) template to the winner group (i.e. the group that was not included in the test and is sent the winning template). The winner group is chosen based on the assigning described above.

Figure 13:
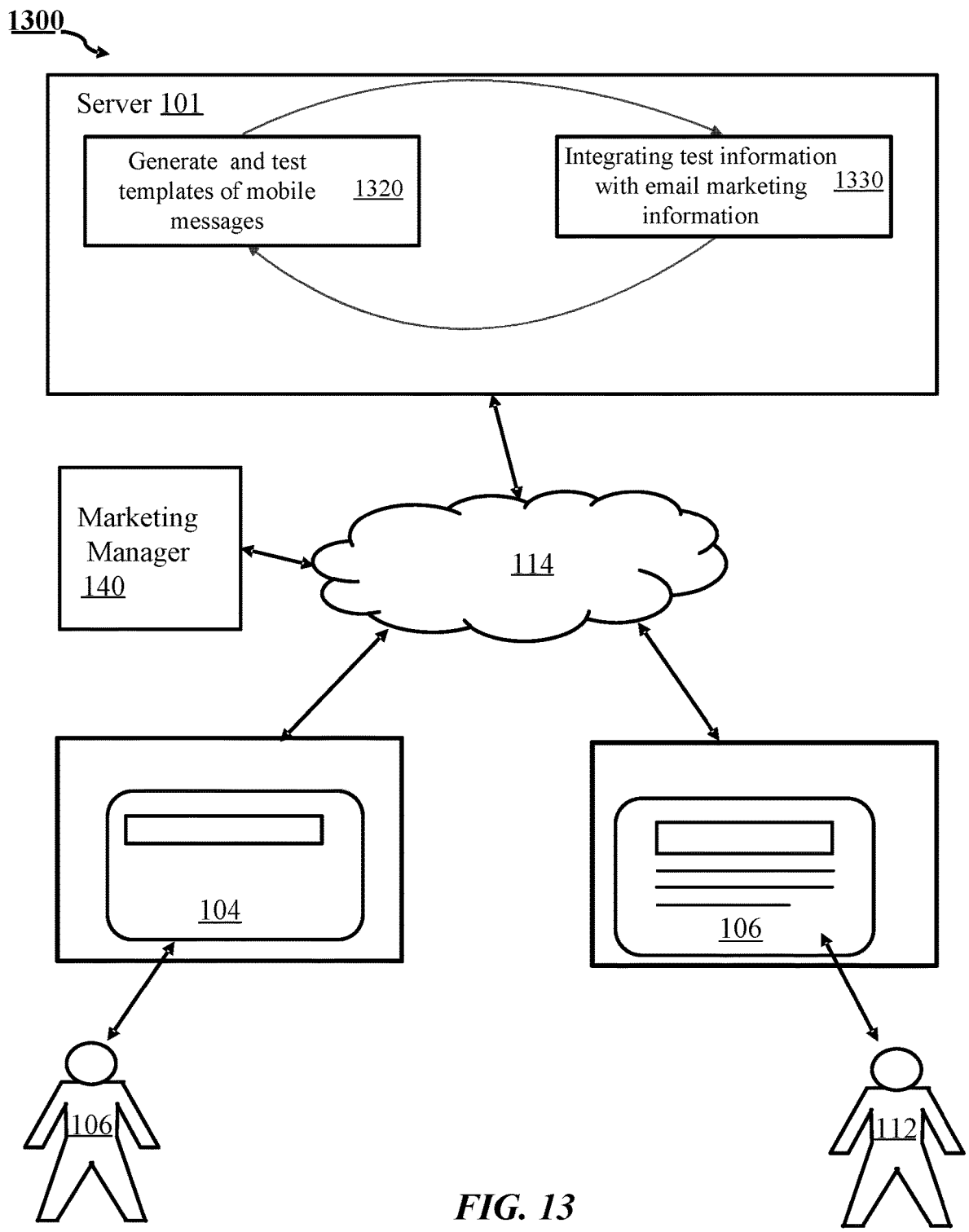
FIG. 13 shows a system that further includes integrating information received from the testing with electronic marketing information, according to an embodiment.

FIG. 13 shows a system 1300 that further includes integrating information received from the testing with electronic marketing information, according to an embodiment.

For an embodiment, integrating the electronic marketing information includes using electronic marketing information to qualify the mobile message recipients. That is, for an embodiment, the electronic marketing information is used to target particular mobile message recipients. For example, for an embodiment, templates are targeted to mobile message recipients that have taken certain actions which have been tracked. That is, the templates in a particular test are only sent to mobile message recipients who have clicked a specific email, specific mobile message, or online activity (or any other specified customer action).

For an embodiment, content in the template(s) is dynamically updated based on actions or characteristics of the user. For example, different images or content of mobile messages of the templates are sent to the mobile message recipients based on the last product that a mobile message recipient browsed. Further, the mobile devices of the mobile message recipients can be tracked and monitored. For an embodiment, the content of the templates is additionally updated by physical location and activities of the mobile message recipients. The physical location and the activities can be sensed and/or identified based on locations and motion sensed by sensors of the mobile devices of the mobile message recipients.

For an embodiment, generating and testing the templates of the mobile messages 1320 is integrated with email (including mobile messages) marketing information 1330 of the mobile message recipients. For an embodiment, the marketing information influences the testing and selecting of the template of the mobile messages. For an embodiment, at least some of the test information determined during testing of the templates is used for influencing marketing information. For example, different coupons may be included with different tested templates to send mobile messages with different discounts.

For an embodiment, integrating electronic marketing information includes ensuring that participants (mobile message recipients) in the test have all taken actions pertaining to other marketing actions. For example, the actions taken can include opening or clicking an email or mobile message within the last X (such as, 7) days. For an embodiment, marketing information is used to qualify participants (mobile message recipients).

For an embodiment, integrating electronic marketing information includes ensuring that different discount offers are present in different templates in the test. For example, this can include a 10% off discount for some templates versus free shipping for other templates that are delivered to the correct test participants though automated mobile messages.

For an embodiment, integrating electronic marketing information includes counting the number of test participants who viewed one template in the test and carried out another action. For example, this can include counting the number of test participants that have purchased a product within the last next Y (for example 7) days.

Figure 14:
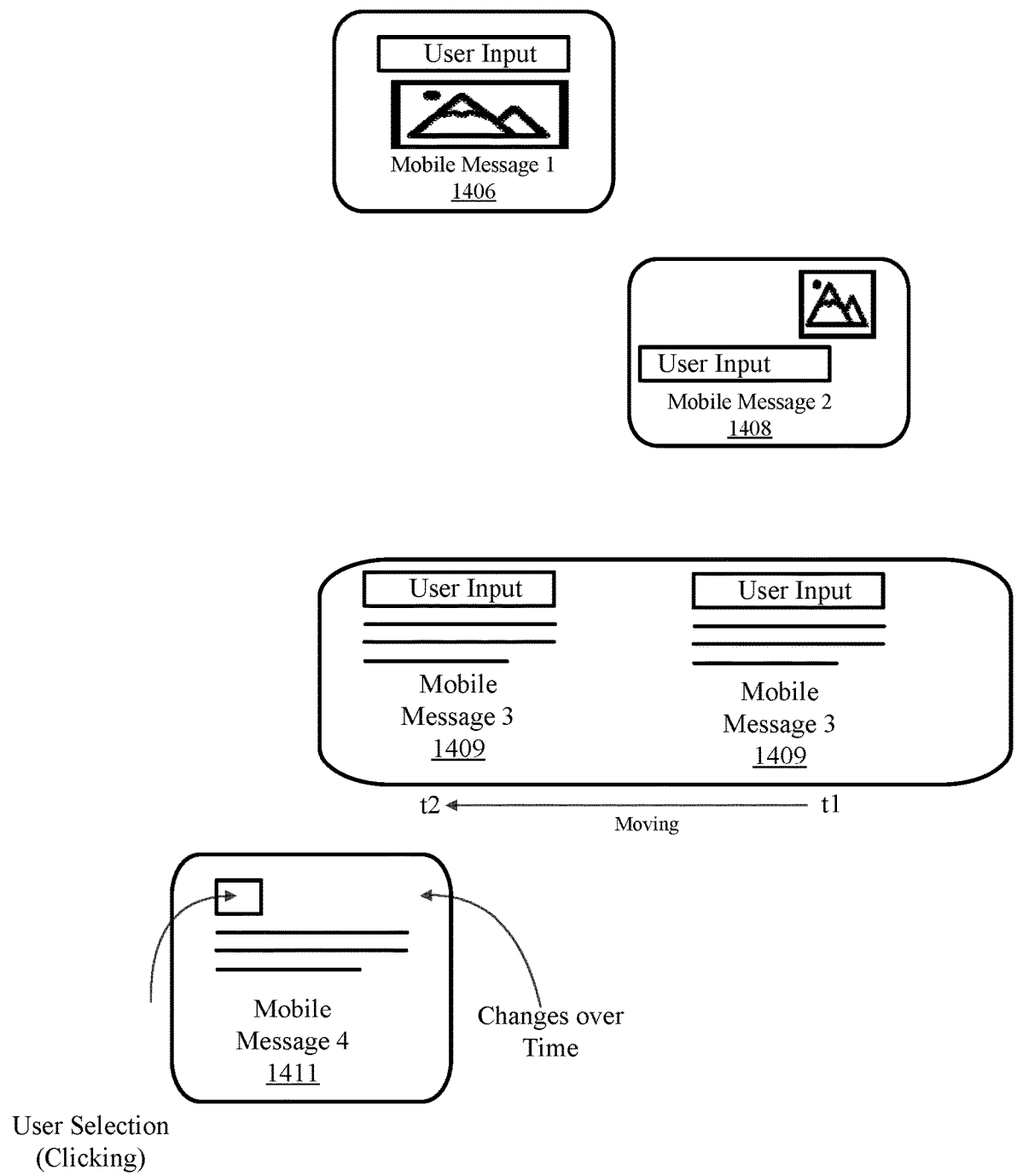
FIG. 14 shows templates of a mobile message each having different content or behavior, according to an embodiment.

FIG. 14 shows templates of a mobile message each having different content, send time, or behavior, according to an embodiment.

For an embodiment, the different content of the first template and the second template includes at least visual representations of the mobile message, including at least one of a text, a layout, a design, colors, or images contained in the mobile message. A first display of the website includes examples of mobile messages 1406, 1408 that have different layouts.

For an embodiment, templates that have different send times are sent to the mobile message recipients at different times. For an embodiment, a different send time of the first template and the second template include a first send time for the first template and a second send time of the second template. For an embodiment, messages received at different times during the day may be more or less likely to achieve success, based on trends observed in both mobile messages and email. That is mobile message recipient behavior can be observed by prior mobile messages to the mobile message recipient, or other types of electronic mail sent to the mobile message recipient. Based on the observer prior behavior of the mobile message recipient, the first and second send times can be selected. Further, there can be legal restrictions on send times, which influence the times the server selects for the first and second send times.

For an embodiment, the different behavior of the first template and the second template includes presenting the mobile message in different ways to different mobile message recipients. For an embodiment, this includes presenting the mobile message in different colors. For an embodiment, this includes presenting the mobile messages to the mobile message for different amounts of time. For an embodiment, this includes presenting the mobile message with different intensities. For an embodiment, this includes mobile messages (such as, mobile messages 1409, 1411) have displays that change with time, for example, a moving emoji.

FIG. 15 is a flow chart of steps of a method of automated testing and selection of multiple templates of a mobile message, according to an embodiment. A first step 1510 includes generating, by a server, at least a first template of the mobile message and a second template of the mobile message, each of the first template and the second template having at least a different content, a different send times, or different behavior. For an embodiment, the mobile message is configured to receive an input from a mobile message recipient.

As previously described, the first and second templates of N templates of the mobile message each have a different content, send time, and/or behavior. Accordingly, the set of data objects of each of the first and second templates combine to represent a structure of mobile messages having a different content, send times, and/or different behaviors. The structure of a mobile message includes the content, the send time, and/or the behavior. For an embodiment, the templates additional include information pertaining to testing of the mobile message(s). The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test.

For an embodiment, the templates are used to integrate the process of testing the mobile messages created by the templates into the practical application of controlling the content and behavior of the resulting mobile messages on a display of a website visitor. As shown in FIG. 9, the content of the mobile messages of the different templates of the mobile message recipients is different, or the send times of the mobile messages of the different templates of the mobile message is different. The different content, different send times, and/or behavior is integral and improves on testing of different mobile messages.

A second step 1520 includes assigning, by the server, a respective group of mobile message recipients to the first template of the mobile message and the second template of the mobile message, wherein the assigning is performed using the described embodiments for assigning. A third step 1530 includes determining automatically, by the server, whether the first template of the mobile message has a statistical advantage over the second template of the mobile message, which includes a fourth step 1540 of collecting test data from testing including qualification for views, views, and successes of the first template of the mobile message and the second template of the mobile message, a fifth step 1550 of generating estimates of a success rates for the first template and the second template including applying an analysis method to the collected test data to determine a win probability difference between a win probability for the first template and a win probability for the second template, and determine that the win probability difference is greater than a selected win threshold, a sixth step 1560 of determining that a precision of the estimates of the success rate is greater than a precision threshold, and a seventh step 1570 of determining that greater than a volume threshold of test data has been collected.

An embodiment includes sending the mobile message of the first template on the website when the first template of the mobile message is determined to have a statistical advantage over the second template of the mobile message. That is, for an embodiment, when the first template is determined to have a statistical advantage over the second template, the first template is identified as the winning template. For an embodiment, the winning template is sent to the remainder of the mobile message recipients determined during the assigning processes previously described, with a 100% allocation. The selection of the winning template based on the success rates of the templates integrates the process of template selection into the practical application of sending the most efficient and effective mobile messages to the mobile message recipients, thereby providing improvements in the computing process of sending the mobile messages.

For an embodiment, the statistical advantage is declared for the first template when the selected win threshold, the precision threshold, and the volume threshold are all met. For an embodiment, the generating of the estimates, determining the precision, and determining the volume threshold, are performed simultaneously.

For an embodiment, the analysis method includes generating a win probability, wherein the win probability represents a probability that a template variation currently leading the testing has a higher success rate than other variations after accounting for random chance. An embodiment includes determining that a conversion rate is similar with conversion rates of marketing mobile messages, as opposed to transactional mobile messages or other types of marketing messages. However, for an embodiment, the applied analysis method is optimized for conversion rates similar with conversion rates of those seen in mobile messages. For example, for a Bayesian prior that is constructed using historical mobile message data. For an embodiment, this is specific to the expected data setting for an individual mobile message, using factors such as success rates on mobile messages with similar behavior, send time, and content, success rates on for mobile messages from the same site or similar sites.

For an embodiment, determining that the precision of the estimates of the success rate is greater than a precision threshold includes comparing a fraction of credible intervals that are overlapping, wherein credible intervals include a range of values that the success rate is likely to fall within after accounting for random chance. As previously described, a third step 1030 of FIG. 10 includes a) calculating 95% posterior credible intervals for each variation of the template representing the range of values that the success rate for this template is likely (in particular having a 95% level of confidence that the interval contains the true value of the success rate if infinite data is gathered) to take, and incorporating both the information contained in the Bayesian prior and the collected data), b) for each non-leading variation, calculating the percent that the credible interval for the leading variation of the template overlaps the credible interval for the non-leading variation (that is, intervals that have been defined above may overlap. That is, if one interval is (0, 10) and the second interval is (5, 15), then the percent overlap would be 50%), and c) determining if all these percentages are less than a predetermined percentage (such as, 10%), and the interval criterion is met. For an embodiment, step 1030 is a necessary step to compute the precision threshold.

For an embodiment, assigning a respective group of the mobile message recipients to the first template of the mobile message and the second template of the mobile message, wherein the assigning is random, includes applying an adaptive method to set an allocation of mobile message recipients to templates that are performing better, randomly assigning the mobile message recipient to the first template and the second template based on the allocation, and sending the first template or the second template to the mobile message recipients as randomly assigned. For an embodiment, the assigning is random with equal probabilistic distributions within each geographical region that the test is sent to. For example, the mobile message may be sent to mobile message recipients from N different geographical regions. For an embodiment, an equal number of mobile messages is sent to each of the geographical regions, but randomly sent to the mobile message recipients within each of the regions.

For at least some embodiments, the assignment of each of the mobile message recipients is included within information attached to a profile of the mobile message recipient, wherein the information allows actions by the mobile message recipient to be tracked.

At least some embodiments further include integrating information received from the testing with electronic marketing information. For an embodiment, the electronic marketing information includes one or more of site visitor actions, discount offers, and product purchases. For an embodiment, integrating information received from the testing with electronic marketing information comprises using electronic marketing information to qualify the mobile message recipients for the testing includes ensuring that mobile message recipients in the testing have all taken actions pertaining to other marketing actions. For an embodiment, integrating information received from the testing with electronic marketing information comprises dynamically updating content in the templates based on actions or characteristics of the user within the electronic marketing information. For an embodiment, integrating information received from the testing with electronic marketing information includes at least some of the test information determined during testing of the templates being used for influencing marketing information.

As previously described and shown in FIGS. 9 and 14, for an embodiment, the different content of the first template and the second template includes at least visual representations of the form, including at least one of a size, a text, a layout, a design, colors, or images of the form. For an embodiment, the different content includes images that may increase or decrease likelihood of success due to being more or less engaging. For an embodiment, the different content includes different ways of wording an offer that can change success rates even if the offer itself is not changed. For an embodiment, the different content includes different emojis and different audiences react differently to the different emojis.

For an embodiment, a different send time of the first template and the second template include a first send time for the first template and a second send time of the second template. For an embodiment, messages received at different times during the day may be more or less likely to achieve success, based on trends observed in both mobile messages and email. That is mobile message recipient behavior can be observed by prior mobile messages to the mobile message recipient, or other types of electronic mail sent to the mobile message recipient. Based on the observer prior behavior of the mobile message recipient, the first and second send times can be selected. Further, there can be legal restrictions on send times, which influence the times the server selects for the first and second send times.

For an embodiment, each of the first template and the second template further include different behavior, wherein the different behavior includes at least one of changes of the mobile messages over time, movement of the mobile messages, or changing color or intensity of the mobile messages. Further, for an embodiment, the different behavior of the first template and the second template includes at least a changing display (such as, changing content, changing color, and/or moving content) on the mobile device of the mobile message recipient.

For an embodiment, at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the mobile message recipient actions of the first template of the mobile message and the second template of the mobile message.

Figure 16:
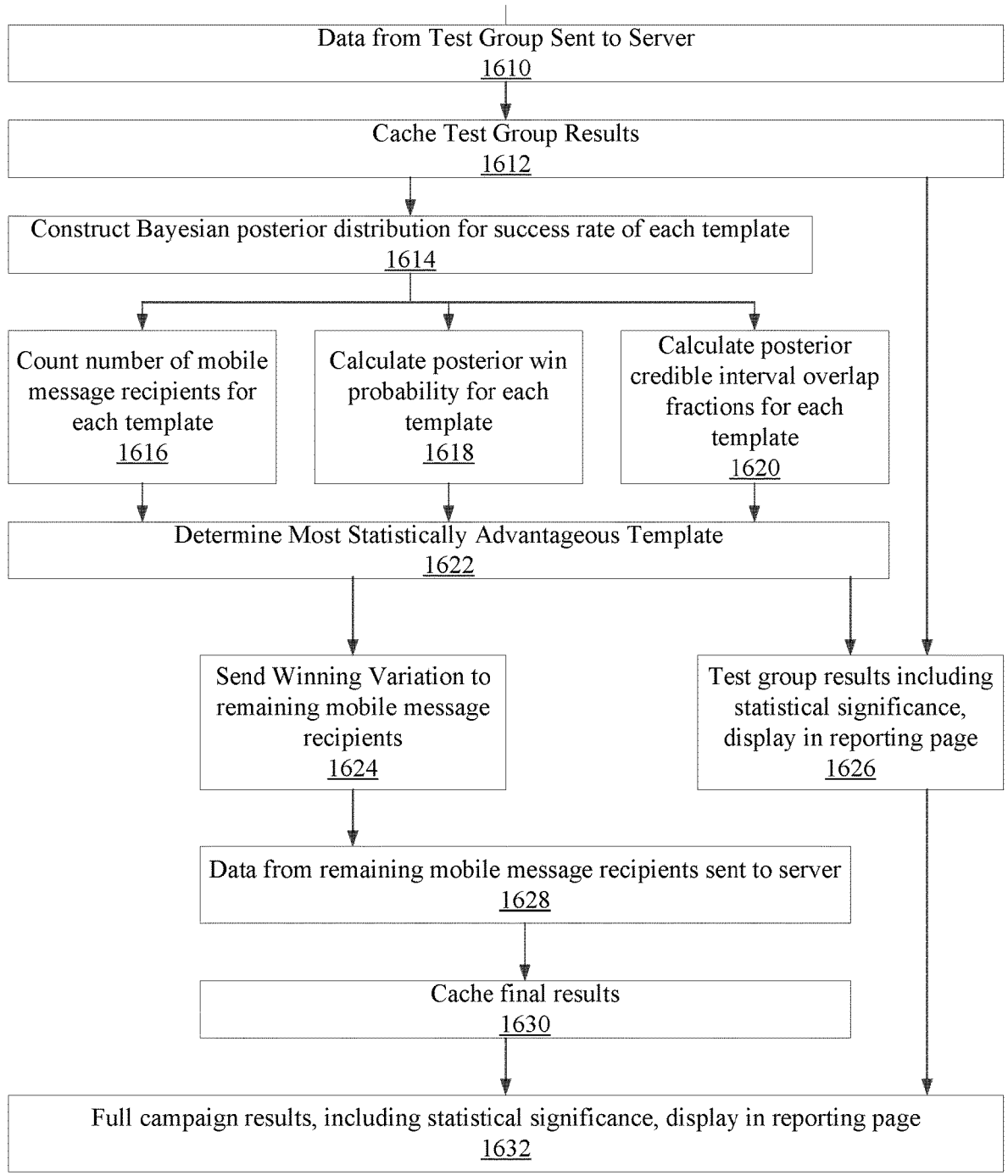
FIG. 16 is a flow chart that includes steps of a method of testing variations of templates, according to an embodiment.

FIG. 16 is a flow chart that includes steps of a method of testing variations of templates, according to an embodiment. A step 1610 includes sending data from the test group to, for example, server 101. For an embodiment, the includes test data, which includes at least one of the mobile message recipients included in the test per template, the number of mobile messages sent per template, the number of clicks and/or successes observed per template, the time at which each mobile message was sent or click/success was observed, and/or any data gathered in the course of sending the message (e.g. updates to subscription settings).

A step 1612 includes caching the test group results. For an embodiment, this includes storing the data obtained in step 1610, which represents the test data at a point in time when the test ended. The data may further include test settings not gathered in step 1610, such as the test duration, test size, and content of the templates.

A step 1614 includes constructing a Bayesian posterior distribution for the success rate of each of the templates. The Bayesian posterior distribution has been previously described, but for an embodiment, the Bayesian posterior distribution represents a best estimate of the success rate of each template, while taking test data, prior information from similar tests, and statistical uncertainty into account.

A step 1616 includes counting a number of mobile message recipients for each template. For an embodiment, this includes the number of planned mobile message recipients that were sent a message and that actually received the mobile message (that is, the mobile message did not fail to send).

A step 1618 calculating a posterior win probability for each of the template. A step 1620 includes calculating a posterior credible interval overlap fractions for each of the templates. The posterior credible interval overlap fractions have been previously described, but for an embodiment, the posterior credible interval overlap fractions represents the extent to which the nominally highest success for any template is actually higher than the success rate for all other templates, after taking statistical uncertainty into account.

A step 1622 includes determining the most statistically advantageous template based on the counted number of mobile message recipients, the posterior win probability, and the posterior credible interval overlap fractions for each of the templates.

A step 1624 includes sending the mobile message according to the winning variation of the template to the remaining mobile message recipients. For an embodiment, the remaining mobile message recipients includes the planned mobile message recipients that were not included in the testing (that is, mobile message receipts that did not receive mobile messages according to the first template (template 1) or the second template (template 2).

A step 1626 includes displaying the test group results including the statistical significance in a reporting page. For an embodiment, the reporting page is a page that the server 101 makes available to the marketing manager. For an embodiment, the reporting page shows test data as well as data from an entire period after the mobile message was sent, including the distribution of data over time, as well as information about the mobile message, such as the test settings, the content of the templates, which template was the winner of the test, and whether the winner of the test had a statistically significant advantage over all other templates.

A step 1628 includes sending data from remaining mobile message recipients to the server. For an embodiment, as described, this allows the reporting page to show data from the entire period after the mobile message was sent, including after the testing is over.

A step 1630 includes caching the final results.

A step 1632 includes displaying full electronic campaign results including statistical significance in the reporting page.

Figure 17:
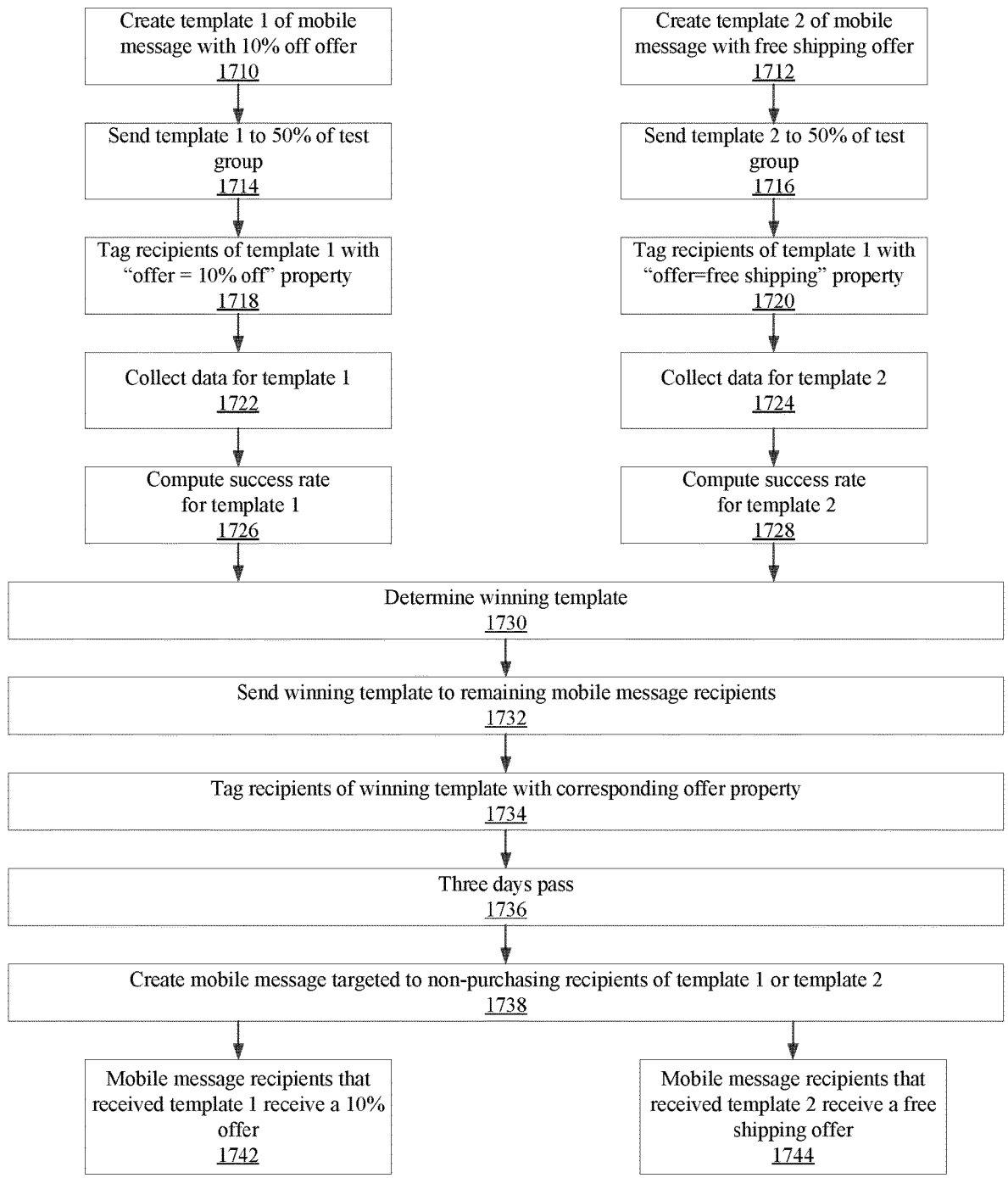
FIG. 17 is a flow chart that includes steps of a method of selecting content, send times, and behavior of templates and integrating the different content or behavior with marketing activities, according to an embodiment.

FIG. 17 is a flow chart that includes steps of a method of selecting content, send times, and behavior of templates and integrating the different content or behavior with marketing activities, according to an embodiment.

Steps 1710, 1712 include creating a template 1 of the mobile message that includes a 10% off offer and creating a template 2 that includes a free shipping offer. The two different templates generate mobile messages with different content. While the generated mobile messages according to the template 1 and the template 2 include different content, it is to be understood that the generated mobile messages could also include different send times or different behavior as well.

Steps 1714, 1716 include sending the mobile messages according to the template 1 and the template 2. According to step 1714, 50% of the test group are sent the mobile message according to the template 1, and according to step 1716, 50% of the test group are sent the mobile message according to the template 2. Other embodiments could include a different allocation between template 1 and template 2, either selected by the user or adaptively determined by the server based on the content, send times, or behavior of the templates.

Steps 1718, 1720 include tagging the recipients of the mobile message according to the template 1 with a "offer=10% off" property and tagging the recipients of the mobile message according to the template 2 with a "offer=free shipping" property. For an embodiment, tagging indicates that the mobile message recipient's profile reflects that the mobile message recipient has received an offer of the corresponding type.

Steps 1722, 1724 include collecting data of mobile recipient actions for mobile recipients that receive mobile messages according to the template 1 and collecting data of mobile recipient actions for mobile recipients that receive mobile messages according to the template 2.

Steps 1726, 1728 include determining success rate of the mobile message according to the template 1, and the success rate of the mobile message according to the template 2, based on the collected data of the mobile recipient actions.

Step 1730 includes determining the winning template based on the determined success rates.

Step 1732 includes sending mobile messages to the remaining mobile message recipients according to the determined winning template.

Step 1734 includes tagging the mobile messages according to the winning template that are sent to the mobile message recipients with the corresponding offer property.

Step 1736 includes tracking the mobile message recipient actions in response to receiving the mobile messages according to the winning template for a period of time, such as, three days.

Step 1738 includes creating additional mobile messages targeted to non-purchasing mobile message recipients of the mobile messages according to the template 1 or the template 2. For an embodiment, this includes the marketing manager creating alternate testing templates (template 1' and template 2') that contain the same offers as template 1 and template 2, respectively, but potentially different content, send times, or behaviors. For example, the alternate templates may include a statement like "You missed this deal". For an embodiment, the marketing manager creates a template 3, which has different content, send times, and/or behaviors than templates 1 and 2 but references the offer that the mobile message recipient received in either template 1 or 2.

Steps 1742, 1744 include providing mobile message recipients that receive the mobile message according to the template 1 with the 10% offer, and providing mobile message recipients the receive the mobile message according to the template 2 with the "free shipping" offer. For an embodiment, mobile message recipients who receive a mobile message according to template 1' will receive the same 10% off offer that they received in the mobile message according to template 1, and mobile message recipients who receive a mobile message according to template 2' will receive the same free shipping offer that they received in the mobile message according to template 2.

Although specific embodiments have been described and illustrated, the embodiments are not to be limited to the specific forms or arrangements of parts so described and illustrated. The described embodiments are to only be limited by the claims.

What is claimed:

1. A computer-implemented method for testing of a mobile message, comprising:

generating, by a server, at least a first template of the mobile message and a second template of the mobile message, each of the first template and the second template having at least a different content or a different send time;

determining, by the server, information associated with the mobile message;

identifying and sending, by the server, guidance for a marketing manager based on the information associated with the mobile message, wherein the marketing manager selects user-selected configurations in response to the guidance;

receiving, by the server, the user-selected configurations from the marketing manager in response to the guidance;

assigning, by the server, a first respective group of mobile message recipients to the first template of the mobile message and a second respective group of mobile message recipients to the second template of the mobile message, wherein the assigning is based on the information associated with the mobile message and the user-selected configurations received from the marketing manager;

determining automatically, by the server, whether the first template of the mobile message has a statistical advantage over the second template of the mobile message through testing based on the assigning, wherein the testing comprises;

collecting test data from testing including mobile message recipient actions of the first template of the mobile message and the second template of the mobile message;

generating estimates of mobile message recipient actions for the first template and the second template including applying an analysis method to the collected test data to determine a win probability difference between a win probability for the first template and a win probability for the second template, and determine that the win probability difference is greater than a selected win threshold;

determining that a precision of the estimates of a success rate is greater than a precision threshold; and sending the mobile message of the first template to a remainder of planned mobile message recipients when the first template of the mobile message is determined to have the statistical advantage over the second template of the mobile message.

2. The method of claim 1, wherein the information associated with the mobile message is stored in a database that is accessible by the server and includes information pertaining to a merchant of the marketing manager and mobile message recipients of the merchant.

3. The method of claim 2, wherein the information associated with the mobile message comprises a message content and a send time.

4. The method of claim 2, wherein the information associated with the mobile message comprises a geolocation of a cell carrier that operates to send the mobile message.

5. The method of claim 2, wherein the information associated with the mobile message comprises legal restrictions in selected regions in which the mobile message is to be sent.

6. The method of claim 2, wherein the information associated with the mobile message comprises latency of reported subsequent actions by cellular carriers.

7. The method of claim 2, wherein the information associated with the mobile message comprises platform-wide event rates and latency.

8. The method of claim 1, wherein identifying and sending the guidance for the marketing manager based on the information associated with the mobile message comprises:
generating, by the server, guidance to the marketing manager based on the information associated with the mobile message; and
communicating, by the server, the guidance to the marketing manager.

9. The method of claim 8, wherein the guidance is based on SMS (short message service) compliance laws.

10. The method of claim 8, wherein the guidance is based on an expected number of mobile message recipients included in a testing of the first and second templates.

11. The method of claim 8, wherein the guidance is based on a metric to be used to determine a winner of a testing of the first and second templates.

12. The method of claim 1, wherein the received user-selected configurations include a size of a testing of at least the first template and the second template.

13. The method of claim 1, wherein the received user-selected configurations include a duration of testing of at least the first template and the second template.

14. The method of claim 1, wherein the received user-selected configurations include a send time of the mobile message including at least the first template and the second template of testing of at least the first template and the second template.

15. The method of claim 1, wherein the assigning is statistically random across each of a plurality of geolocations of cell carriers.

16. A system for automated testing a mobile message, comprising:
a marketing manager server configured to operate and manage a website;
a plurality of mobile devices configured to receive mobile messages; and
a server electronically connected to the marketing manager server and the plurality of mobile devices, the server configured to:
generate at least a first template of the mobile message and a second template of the mobile message, each of the first template and the second template having at least a different content or a different send time;
determine information associated with the mobile message;
identify and send guidance for a marketing manager based on the information associated with the mobile message;
receive user-selected configurations from the marketing manager in response to the guidance;
assign a first respective group of mobile message recipients to the first template of the mobile message and a second respective group of mobile message recipients to the second template of the mobile message, wherein the assigning is based on the information associated with the mobile message and the user-selected configurations received from the marketing manager;
determine automatically whether the first template of the mobile message has a statistical advantage over the second template of the mobile message through testing based on the assigning, wherein the testing comprises;
collect test data from testing including mobile message recipient actions of the first template of the mobile message and the second template of the mobile message;
generate estimates of mobile message recipient actions for the first template and the second template including applying an analysis method to the collected test data to determine a win probability difference between a win probability for the first template and a win probability for the second template, and determine that the win probability difference is greater than a selected win threshold;
determine that a precision of the estimates of a success rate is greater than a precision threshold; and
send the mobile message of the first template to a remainder of planned mobile message recipients when the first template of the mobile message is determined to have the statistical advantage over the second template of the mobile message.

* * * * *